United States Patent
Logunov et al.

(10) Patent No.: US 11,422,310 B2
(45) Date of Patent: *Aug. 23, 2022

(54) METHODS OF BONDING AN OPTICAL FIBER TO A SUBSTRATE USING A LASER AND ASSEMBLIES FABRICATED BY THE SAME

(71) Applicant: CORNING INCORPORATED, Corning, NY (US)

(72) Inventors: Stephan Lvovich Logunov, Corning, NY (US); Mark Alejandro Quesada, Horseheads, NY (US); Alexander Mikhailovich Streltsov, Corning, NY (US)

(73) Assignee: Corning Incorporated, Corning, NY (US)

( * ) Notice: Subject to any disclaimer, the term of this patent is extended or adjusted under 35 U.S.C. 154(b) by 197 days.

This patent is subject to a terminal disclaimer.

(21) Appl. No.: 16/877,859

(22) Filed: May 19, 2020

(65) Prior Publication Data
US 2020/0369566 A1 Nov. 26, 2020

Related U.S. Application Data

(60) Provisional application No. 62/852,699, filed on May 24, 2019.

(51) Int. Cl.
G02B 6/36 (2006.01)
C03C 27/08 (2006.01)
(Continued)

(52) U.S. Cl.
CPC ............ *G02B 6/3612* (2013.01); *C03C 27/08* (2013.01); *G02B 6/3628* (2013.01); *C03B 37/15* (2013.01);
(Continued)

(58) Field of Classification Search
None
See application file for complete search history.

(56) References Cited

U.S. PATENT DOCUMENTS 4,294,602 A 10/1981 Horne
5,533,158 A 7/1996 Han et al.
(Continued)

FOREIGN PATENT DOCUMENTS

CN 108609841 A 10/2018
EP 1176440 A1 * 1/2002 ............ B23K 26/32
(Continued)

OTHER PUBLICATIONS

Wada, Fumio, Machine Translation of JP 63-069734 A, Mar. 29, 1988, 4 pages. (Year: 1988).*
(Continued)

*Primary Examiner* — Michelle R Connelly
(74) *Attorney, Agent, or Firm* — Grant A. Gildehaus

(57) ABSTRACT

Methods for laser welding one or more optical fibers to a substrate and assemblies are disclosed. In one embodiment, a method of bonding an optical fiber to a substrate having at least one film layer on a surface of the substrate includes directing a laser beam into the optical fiber disposed on the at least one film layer. The optical fiber has a curved surface that focuses the laser beam to a focused diameter. The method further includes melting, using the focused diameter laser beam, a material of the substrate to create a laser bond area between the optical fiber and the surface of the substrate. The laser bond area includes laser-melted material of the substrate that bonds the optical fiber to the substrate. The at least one film layer has an absorption of at least 15% at a wavelength of the focused diameter laser beam.

20 Claims, 22 Drawing Sheets

(51) Int. Cl.
  *C03B 37/15* (2006.01)
  *G02B 6/10* (2006.01)

(52) U.S. Cl.
  CPC .... *C03B 2201/075* (2013.01); *C03B 2203/40* (2013.01); *G02B 6/10* (2013.01)

(56) References Cited

U.S. PATENT DOCUMENTS

| | | | |
|---|---|---|---|
| 6,440,776 | B1 * | 8/2002 | Musk .................. G02B 6/3636 65/36 |
| 6,549,713 | B1 | 4/2003 | Pi et al. |
| 7,480,432 | B2 | 1/2009 | Grzybowski et al. |
| 8,148,179 | B2 | 4/2012 | Aitken et al. |
| 8,616,023 | B2 | 12/2013 | Grzybowski et al. |
| 9,156,238 | B2 | 10/2015 | Liu et al. |
| 9,492,990 | B2 | 11/2016 | Karam et al. |
| 9,636,780 | B2 | 5/2017 | Maattanen |
| 9,666,763 | B2 | 5/2017 | Logunov et al. |
| 9,761,828 | B2 | 9/2017 | Dabich, II et al. |
| 9,787,345 | B2 | 10/2017 | Ames et al. |
| 10,069,104 | B2 | 9/2018 | Dabich, II et al. |
| 10,345,533 | B1 | 7/2019 | Logunov et al. |
| 10,457,595 | B2 | 10/2019 | Boek et al. |
| 10,545,293 | B2 * | 1/2020 | Logunov ............. G02B 6/3628 |
| 2019/0022782 | A1 | 1/2019 | Dejneka et al. |
| 2019/0248123 | A1 | 8/2019 | Logunov et al. |
| 2019/0271814 | A1 | 9/2019 | Logunov et al. |
| 2020/0277225 | A1 | 9/2020 | Logunov et al. |

FOREIGN PATENT DOCUMENTS

| | | | | |
|---|---|---|---|---|
| EP | 1240971 | A2 * | 9/2002 | ............. B23K 26/32 |
| JP | 57029021 | A * | 2/1982 | ............ G02B 6/4202 |
| JP | 63069734 | A * | 3/1988 | ............ G02B 6/3628 |
| JP | 2005165200 | A * | 6/2005 | ........... G02B 6/4248 |
| WO | 2016/069822 | A1 | 5/2016 | |
| WO | 2017/040475 | A1 | 3/2017 | |
| WO | 2018/093857 | A1 | 5/2018 | |
| WO | 2018/093862 | A1 | 5/2018 | |
| WO | 2019160918 | A1 | 8/2019 | |
| WO | 2019195385 | A1 | 10/2019 | |

OTHER PUBLICATIONS

International Search Report and Written Opinion of the International Searching Authority; PCT/US2020/057622; dated Feb. 3, 2021; 19 pages; European Patent Office.

Moriceau et al., "Overview of recent direct wafer bonding advances and applications", Advances in Natural Sciences: Nanoscience and Nanotechnology, vol. 1, 12 pages.

* cited by examiner

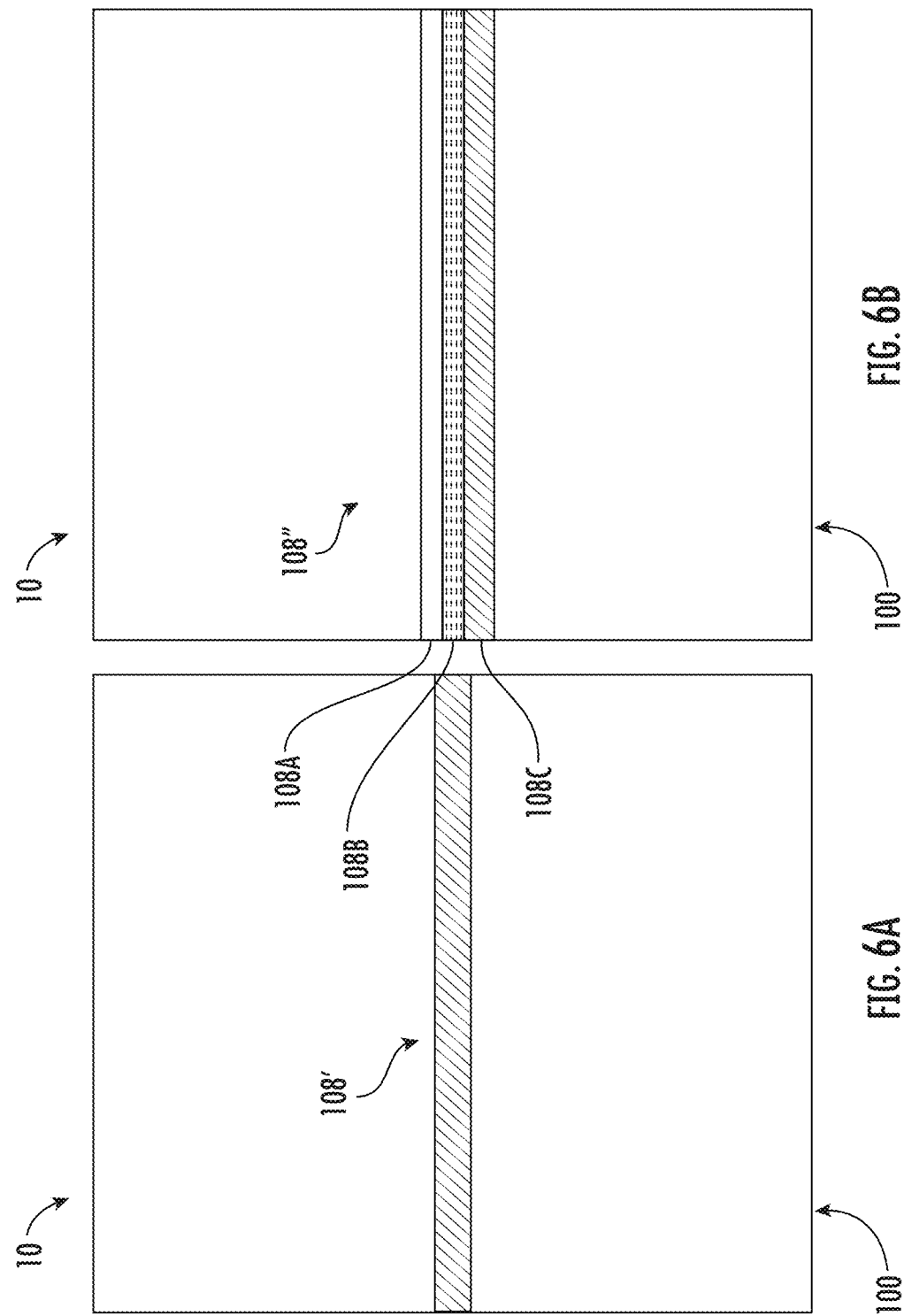

METHODS OF BONDING AN OPTICAL FIBER TO A SUBSTRATE USING A LASER AND ASSEMBLIES FABRICATED BY THE SAME

PRIORITY APPLICATION

This application claims the benefit of priority of U.S. Provisional Application No. 62/852,699, filed on May 24, 2019, the content of which is relied upon and incorporated herein by reference in its entirety.

BACKGROUND

The present disclosure generally relates to fiber arrays and, more particularly to methods and assemblies for optical communication and, more particularly, methods of bonding an optical fiber to a substrate using a laser beam, and assemblies comprising an optical fiber bonded to a substrate.

Benefits of optical fiber include extremely wide bandwidth and low noise operation. Because of these advantages, optical fiber is increasingly being used for a variety of applications, including, but not limited to, broadband voice, video, and data transmission. Optical fibers are often incorporated into fiber connectors having one or more fiber arrays. These types of connectors are often used in data center and telecommunication systems to provide service connections to rack-mounted equipment and to provide inter-rack connections. For example, optical connectors incorporating fiber arrays are employed in optical cable assemblies and optical devices to provide an optical-to-optical connection wherein optical signals are passed between the optical cable assembly and the optical device.

Fiber arrays used in optical connectors may include optical fibers secured within grooves of a substrate by an adhesive and a cover. Typically, the optical fibers are positioned within the grooves of the substrate and then secured in place using the adhesive and cover. The fiber array may then be incorporated in an optical device (such as an optical connector) to provide optical communication between optical devices. In one example, an optical connector incorporating a fiber array is connected to an edge of a waveguide substrate having waveguides providing opto-electronic channels. The waveguide substrate may be a component of a photonic integrated circuit assembly, for example.

In order to provide high quality signal transfer between optical connectors and optical devices, the optical fibers of the fiber array(s) of the optical connector and the optical features of the optical device must be precisely aligned. Misalignment of these elements may cause signal degradation or may prevent optical signals from passing between the optical connector and the optical device.

SUMMARY

Embodiments of the present disclosure are directed to methods for laser welding one or more optical fibers to a substrate, such as a glass substrate, and assemblies made by the disclosed methods. In embodiments, one or more film layers are deposited on a surface of the substrate to promote heating of the substrate to bond the one or more optical fibers to the substrate. The thickness and absorption of optical radiation for the one or more film layers are chosen such that heating is promoted. Particularly, the basis for metal film selection and laser-weld optimization relies on the laser-material interaction mechanism shattering the initial metal film into nano-particles below 250 nm. The general approach is to tune an absorption spectra of the one or more film layers to maximize absorption at the incident laser beam wavelength, and reduce the thickness of the one or more film layers to limit large metallic aggregation in the laser bond area. A balance is struck between the amount of laser energy delivered, and the type and thickness of metal layer used to shatter the metal film layer(s) into nanoparticles.

In one embodiment, a method of bonding an optical fiber to a substrate having at least one film layer on a surface of the substrate includes directing a laser beam into the optical fiber disposed on the at least one film layer. The method further includes melting, using the focused diameter laser beam, at least one of a material of the substrate and a material of the optical fiber to create a laser bond area between the optical fiber and the surface of the substrate. The laser bond area includes laser-melted material of the substrate that bonds the optical fiber to the substrate. The at least one film layer has an absorption of at least 15% at a wavelength of the focused diameter laser beam.

In another embodiment, an assembly includes a substrate having a surface, an optical fiber bonded to the surface of the substrate, and a laser bond area between the optical fiber and the surface of the substrate. The laser bond area includes one or more elements not present in the optical fiber and the substrate outside of the laser bond area.

In yet another embodiment, a method of bonding an optical fiber to a substrate includes directing a laser beam into the optical fiber disposed on the substrate. The laser beam has a wavelength within a range of 1.9 µm to 3 µm, including endpoints. The substrate has an absorption of greater than or equal to 20% at the wavelength of the laser beam. The method further includes melting, using the focused diameter laser beam, at least one of a material of the substrate and a material of the optical fiber to create a laser bond area between the optical fiber and the surface of the substrate, wherein the laser bond area comprises laser-melted material of the substrate that bonds the optical fiber to the substrate.

In yet another embodiment, an assembly includes a glass-based substrate having a planar surface, wherein the glass-based substrate has a hydroxyl (—OH) concentration greater than or equal to 300 ppm, and the glass-based substrate has an absorption of at least 15% at a wavelength within a range of 2.5 µm and 3 µm. The assembly further includes an optical fiber bonded to the planar surface of the glass-based substrate by a laser bond area.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

FIG. 6A schematically depicts a film layer disposed between a first glass substrate and a second glass substrate prior to laser welding according to one or more embodiments described and illustrated herein;

FIG. 6B schematically depicts a multi-layer film layer disposed between a first glass substrate and a second glass substrate prior to laser welding according to one or more embodiments described and illustrated herein;

DETAILED DESCRIPTION

Figure 1:
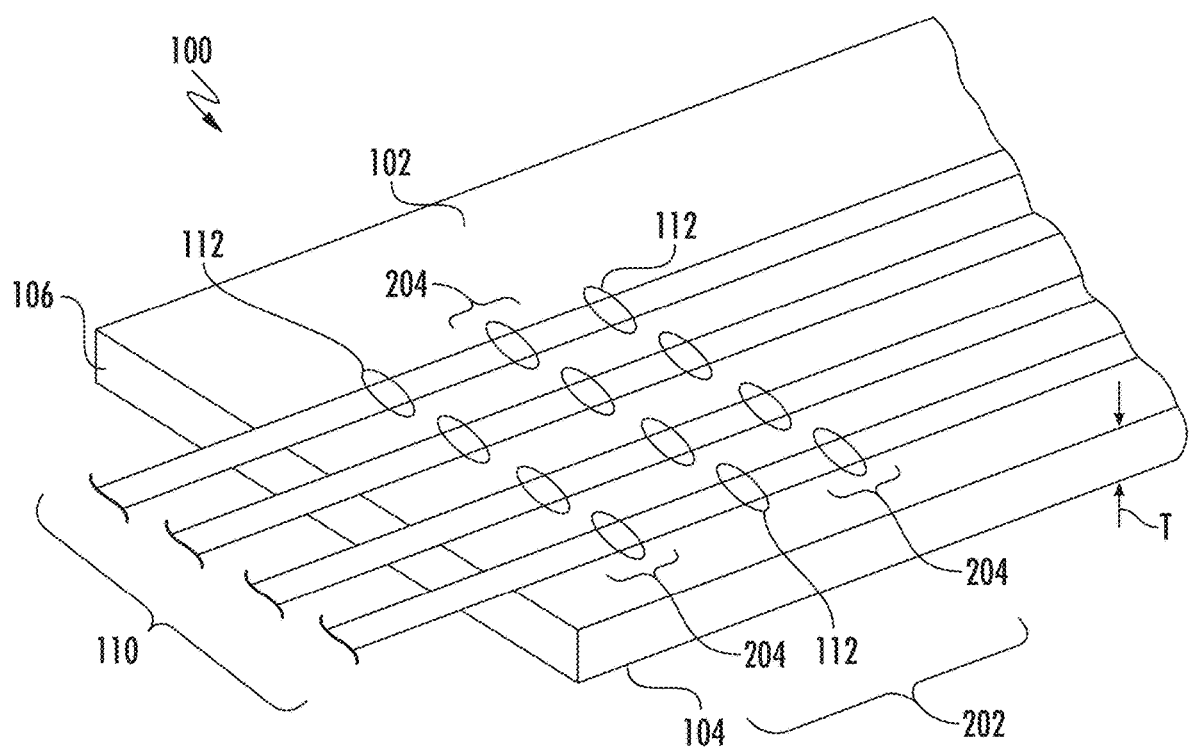
FIG. 1 schematically depicts a perspective view of an assembly comprising a plurality of optical fibers bonded to a substrate by a laser welding process according to one or more embodiments described and illustrated herein.

Embodiments described herein are directed to fiber arrays and methods for forming fiber arrays. In embodiments of the present disclosure, optical fibers, which have a curved shape, are bonded to a flat substrate using a laser beam or multiple laser beams to form laser bond areas.

Fiber arrays formed using methods described herein may be useful in optical connectors such as those used in coupling optical cable assemblies to an edge of a waveguide substrate. In order to provide high quality signal transfer between such optical connectors and optical devices, the optical fibers of the fiber array of the optical connector and the optical features of the optical device must be precisely aligned because misalignment may cause signal degradation or may prevent optical signals from passing between the optical connector and the optical device. Securing the optical fibers to the substrate using laser beams can provide a high precision placement and alignment without the use of traditional V-groove alignment.

However, one of the drawbacks of the laser welding process is the residual stress created by fast heating and cooling of small sections of the assembly. Most of the stress is concentrated within the substrate because it is made from material having a higher coefficient of thermal expansion (CTE) than the material of the optical fiber. Some of the stress is compressive, and makes bonded parts stronger; however there is always tensile stress, which may lead to crack development over time. The presence of cracks in the substrate may still not affect the immediate performance, but cracks can propagate over time due to environmental variations.

In embodiments, the amount of stress laser-welding induces in the substrate may be reduced by using thin film layers, therefore creating less of a compositionally mixed laser bond area when the film gets disintegrated due to the rapid laser-heating process. The general approach is to minimize the overall film thickness, whether using multi-layer films, glass, ceramic or metal films. In the case of metal film usage, reducing the metallic portion of the film layer may limit the large metallic aggregation development in the laser-laser bond area. Minimization of the film layer thickness provides a cost advantage and a simplified process.

Embodiments are also directed to laser-welding processes at the optical fiber-substrate interface without absorbing film layer(s) using mid-IR lasers. The mid-IR laser wavelength is transmitted through the optical fiber, and tuned to the absorption band of the bottom substrate (or by multi-photon absorption) to increase swelling of the substrate. The contact weld area between the optical fiber(s) and the substrate may be adjusted by tuning the laser wavelength, the laser power, the focusing conditions, and the beam scanning speed (or the irradiation time if spot welding is performed). In this way, the adjustment of the fiber height position versus the substrate may be accomplished.

Additionally, the portions of the optical fibers in the laser bond zones (also referred to herein as laser bond areas) are able to be precisely located and secured on the substrate but the optical fibers, the substrate, or both the optical fibers and the substrate in the laser bond zones may also have higher stress concentrations than the portions of the optical fibers and the substrate outside of the laser bond zones. To isolate the stress concentrations from the connector interface while still maintaining the precise location of the fibers, the fibers and the substrate may be cut to form two or more sections of the fiber array wherein the cut takes place in the adhesive bond zone and a specified distance away from the laser bond zone (or laser bond zones) to reduce, minimize, or eliminate stress caused by the laser bond process at the cut ends of the optical fibers. The cut ends of the optical fibers are still secured in place by the adhesive bond zones and may then be processed (e.g., polished and placed within a housing) to form an optical device such as an optical connector.

As used herein, the term "melt" means that a material is modified by heating in any manner that bonds an optical fiber to a substrate, and includes, but is not limiting to, actual melting of the substrate material as well as visco-elastic swelling of the substrate material.

Figure 2:
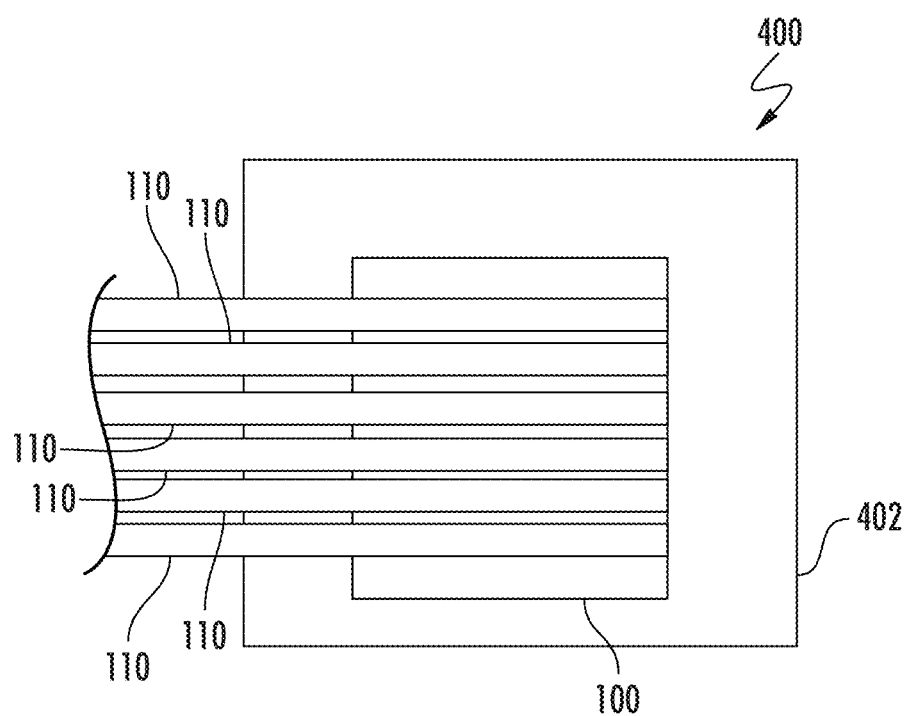
FIG. 2 schematically depicts a connector having an assembly comprising a plurality of optical fibers bonded to a substrate by a laser welding process according to one or more embodiments described and illustrated herein.

Referring now to FIG. 1, a partial perspective view of a substrate 100 with a plurality of optical fibers 110 bonded thereto is schematically depicted. As an example and not a limitation, the substrate 100 and the plurality of optical fibers 110 may be incorporated into a fiber optic connector, as illustrated schematically in FIG. 2. For example, the optical fiber connector 400 of FIG. 2 may include a housing 402 and the substrate 100 and at least a portion of the optical fibers 110 may be located in the housing 402. It should be understood that embodiments described herein are not limited to fiber optic connectors. The optical fiber and substrate assemblies may be incorporated into other optical devices.

Referring again to FIG. 1, the example substrate 100 comprises a planar first surface 102 (also referred to herein as an upper surface), a second surface 104 opposite the first surface 102 and at least one edge 106 extending between the first surface 102 and the second surface 104. Planar means that there are no grooves in the surface to hold optical fibers 110. In some embodiments, the substrate 100 may be made of a low melting temperature material capable of migrating into, around, or into and around the material of the optical fiber 110. Generally, the melting temperature of the substrate 100 should be lower than the melting temperature of the optical fibers 110. An example non-limiting material for the optical fibers 110 is a non-absorbing glass-based substrate having a hydroxyl (—OH) concentration within its composition of less than about 10 ppm, or even or less than about 5 ppm, such as about 10, 9, 8, 7, 6, 5, 4, 3, 2, 1 ppm or less, including all ranges and subranges therebetween. Example materials for the substrate 100 include, but are not limited to, glass, silica, glass ceramics, ceramics such as alumina or zirconia-based ceramics, Yttrium-Stabilized Zirconia, crystals such as sapphire, and silicon. Non-limiting glass materials include alkaline earth boro-aluminosilicate glass (e.g., as manufactured and sold under the trade name Eagle XG® by Corning Incorporated of Corning, N.Y.) and alkali-aluminosilicate glass (e.g., as manufactured and sold by Corning Incorporated of Corning, N.Y. under the trade name Gorilla® Glass). Other examples include Pyrex® and Borofloat. As non-limiting examples, the softening point for Eagle XG® is about 970 C. Other non-limiting examples of glass include BK7 glass, soda lime, and other glasses with flat or polished surfaces. As used herein, the term "glass-based substrate" includes, glass, ceramic, and glass-ceramics.

For such glasses, the softening point may be within a range of about 650 C to about 800 C, including endpoints. The softening point for fused silica is about 1715 C, so any glass with softening point less than 1500-1600 C may be acceptable. It should be understood that the substrate 100 may be made of other materials and the material of the substrate 100 is not limited by this disclosure. The thickness T of the substrate 100 is also not limited by this disclosure. The thickness T of the substrate 100 may be any thickness as desired for the end-application of the optical fiber 110 and substrate 100 assembly.

Figure 12:
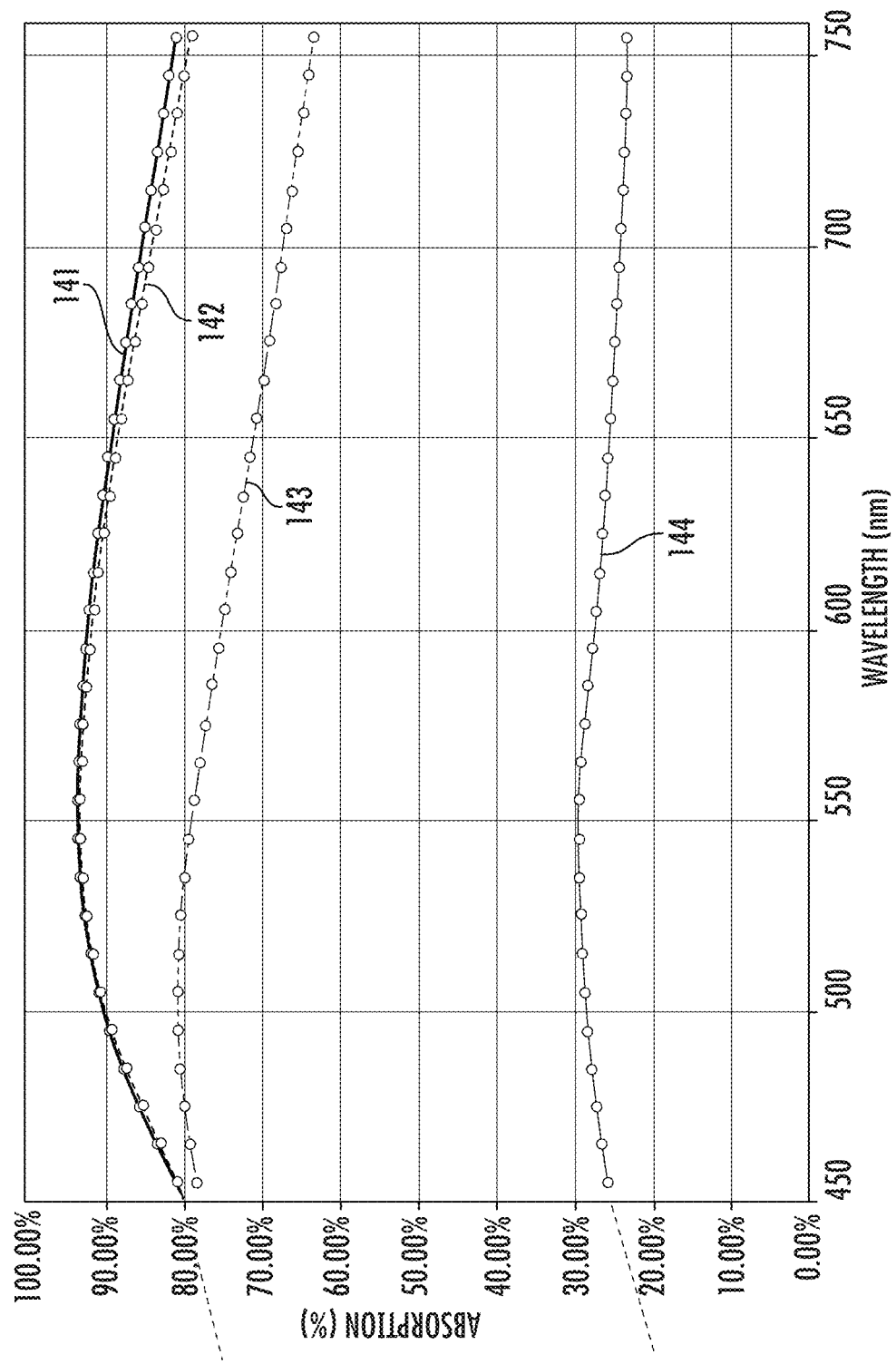
FIG. 12 graphically illustrates absorption as a function of wavelength for film layers having a 50 nm thick chromium oxynitride film layer and a chromium film layer at varying thicknesses according to one or more embodiments described and illustrated herein.

The plurality of optical fibers 110 are bonded to the first surface 102 of the substrate 100 by one or more laser bonding (also referred to herein as laser welding) processes as described in detail below. If needed, the optical fibers 110 are stripped of any jacket (see e.g., jacket 248 in FIG. 12) or outer layers prior to bonding to the substrate 100. Although FIG. 1 depicts four optical fibers 110, it should be understood that any number of optical fibers 110 may be bonded to the surface 102 of the substrate 100 (i.e., one or more optical fibers 110). It should also be understood that the optical fibers 110 may be bonded to the second surface 104, or both the first surface 102 and the second surface 104 of the substrate 100.

The optical fibers 110 may be fabricated from any material having a higher melting temperature than that of the substrate 100. As noted above, the optical fibers 110 may be fabricated from fused silica as a non-limiting embodiment. In the embodiment illustrated in FIGS. 3 and 4, the optical fibers 110 have a round shape in cross section. However, the optical fibers 110 may be elliptical in shape or have any other suitable shape. As described in more detail below, the optical fibers 110 may have at least one curved surface that focus a laser beam to a focused diameter such that a size (e.g., a diameter) of the laser beam at the contact area 113 (FIG. 3) between the optical fiber 110 and the first surface 102 of the substrate 100 is smaller than a size of the initial diameter of the laser beam as it enters the optical fiber 100. While circular cross-section fibers are discussed herein, fibers having other cross-sectional shapes may be used, such as, for example, square or rectangular cross-section fibers. When fibers without a curved surface are in use (e.g., square or rectangular cross-section fibers), the laser source may include or utilize a lens to focus the laser beam.

Each optical fiber 110 is bonded to the first surface 102 of the substrate 100 at one or more laser bond areas 112 (also called a bond area, an additional laser bond area, a first laser bond area, a second laser bond area) along the length of the optical fiber 110. It is noted that the laser bond areas 112 are denoted by ellipses in FIG. 1. As described in detail below, the laser bond areas 112 are regions of the first surface 102 of the substrate 100 where the optical fiber 110 contacts the first surface 102 of the substrate 100 and the material of the substrate 100 is laser-melted (i.e., melting caused by a laser beam) and secured to the optical fiber 110, for example, by diffusing into the material of the optical fiber 110, forming around the optical fiber 110, or both diffusing into the material of the optical fiber 110 and forming around the optical fiber 110. The laser bond areas 112, which includes laser-melted material caused by the application of a laser beam, bond (also referred to herein as welding) the optical fiber 110 to the first surface 102. It is noted that, in some embodiments, heating of a contact area 113 (FIG. 3 between optical fiber 110 and the first surface 102 of the substrate 100 may be provided by application of electromagnetic energy (e.g., microwaves) rather than a laser beam.

Referring again to FIG. 1, any number of laser bond areas 112 may be provided along the length of the optical fiber 110. For example, in the embodiment illustrated in FIG. 1 each optical fiber 110 has three laser bond areas 112 securing each fiber 110 to the substrate 104. A group of closely arranged laser bond areas 112 is referred to herein as a laser bond zone. Thus, in some embodiments a single row 204 of laser bond areas 112 that are spaced from other laser bond areas 112 (or a single row 204 of laser bond areas 112 that are the only laser bond areas 112 for the optical fibers 110) may be referred to as a laser bond zone 202. In other embodiments, such as the embodiment illustrated in FIG. 1, two or more rows 204 of laser bond areas 112 that are in close proximity form a laser bond zone 202. Thus, as used herein, the term laser bond zone 202 may include a single laser bond area 112 or a plurality of laser bond areas 112 that are in close proximity to each other.

Figure 1A:
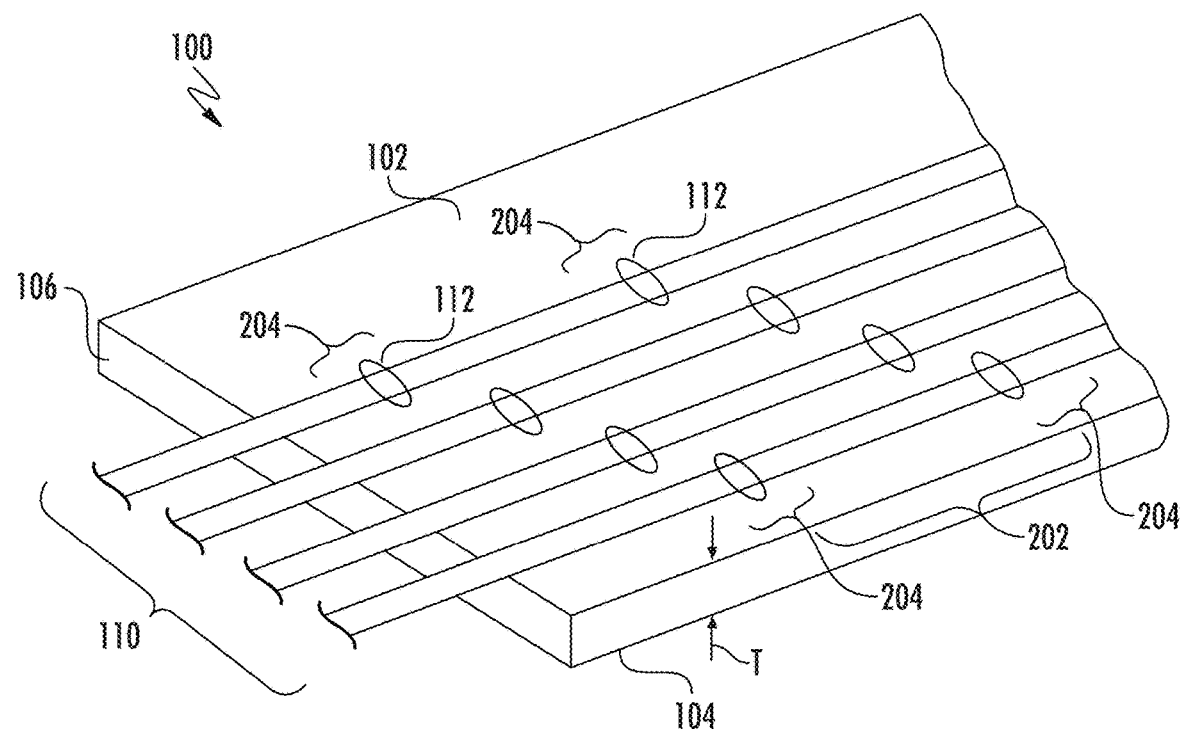
FIG. 1A is similar to FIG. 1, but illustrates an assembly where the plurality of optical fibers are bonded to the substrate by a laser welding process involving a different pattern of bond zones.
Figure 1B:
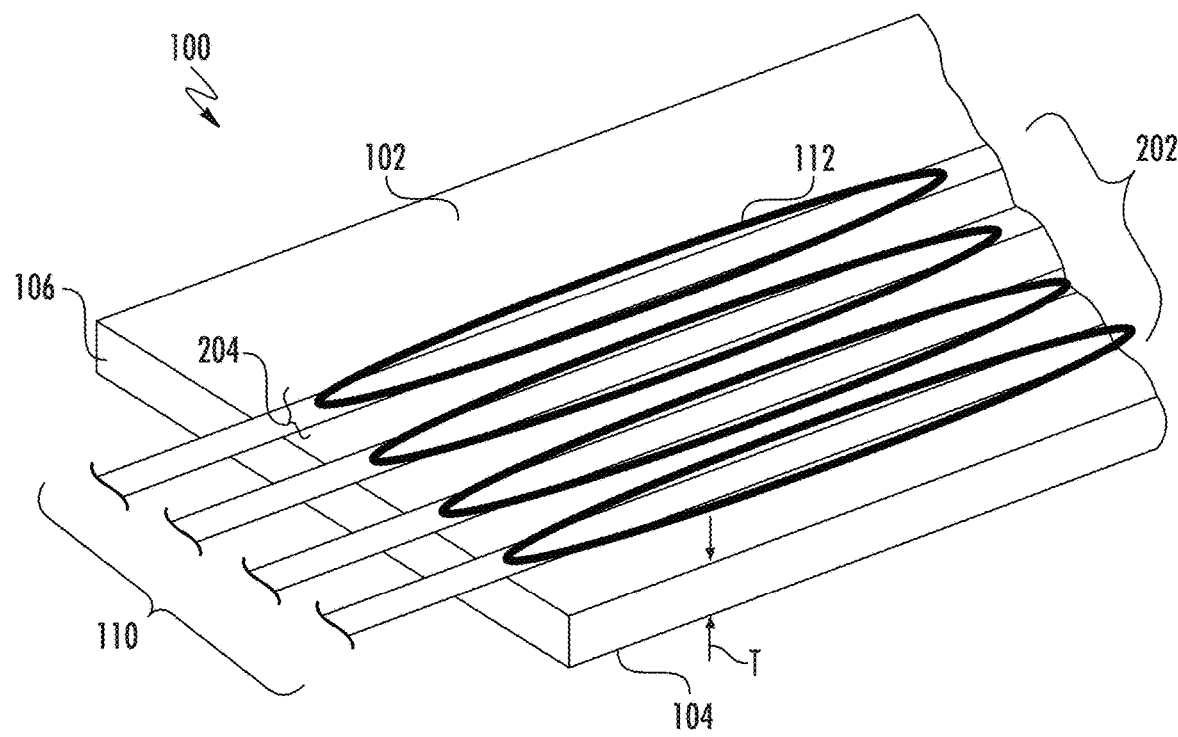
FIG. 1B is similar to FIG. 1, but illustrates an assembly where the plurality of optical fibers are bonded to the substrate by a laser welding process involving bond zones along lengths of the optical fibers on the substrate.

The row(s) 204 of laser bond areas 112 may or may not be perpendicular to the optical fibers 110. Thus, although the rows 204 in FIG. 1 appear perpendicular to the optical fibers 110, FIG. 1A illustrates an embodiment where rows 204 of laser bond areas 112 are diagonal/non-perpendicular to the optical fibers 110. In some embodiments, such as the embodiment shown in FIG. 1B, the laser bond areas 112 may be along the lengths of the optical fibers 110. The laser bond areas 112 in such an embodiment are effectively rows 204 themselves.

Figure 3:
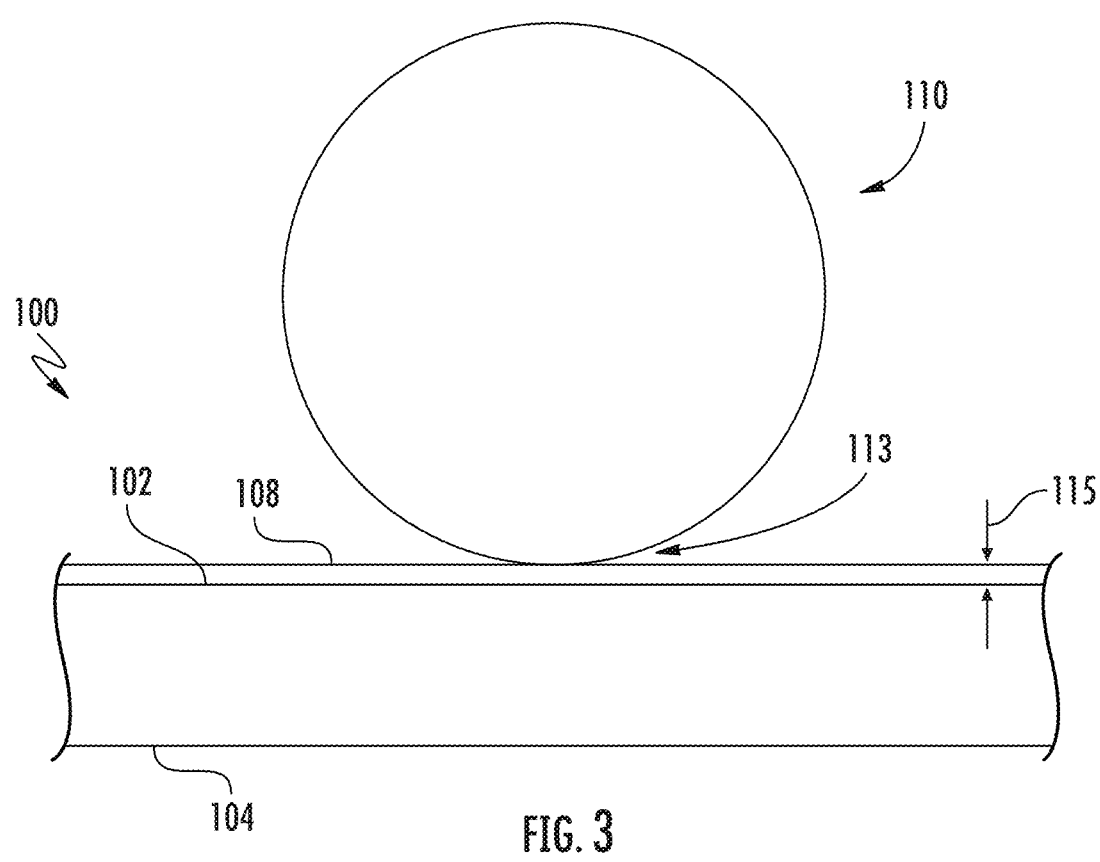
FIG. 3 schematically depicts an end view of an optical fiber positioned on a film layer disposed on a surface of a substrate according to one or more embodiments described and illustrated herein.
Figure 4:
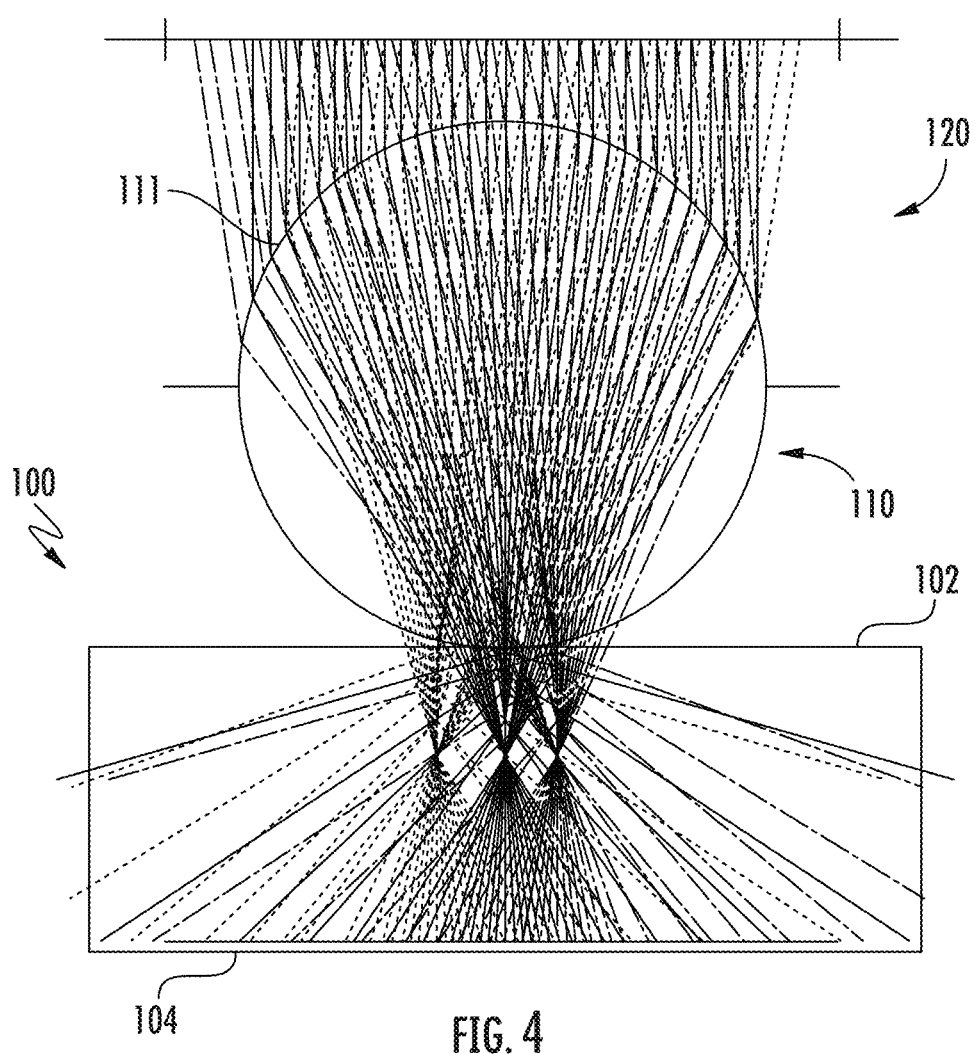
FIG. 4 schematically depicts ray tracing of light of a laser beam focused by the optical fiber depicted by FIG. 2 according to one or more embodiments described and illustrated herein.
Figure 5:
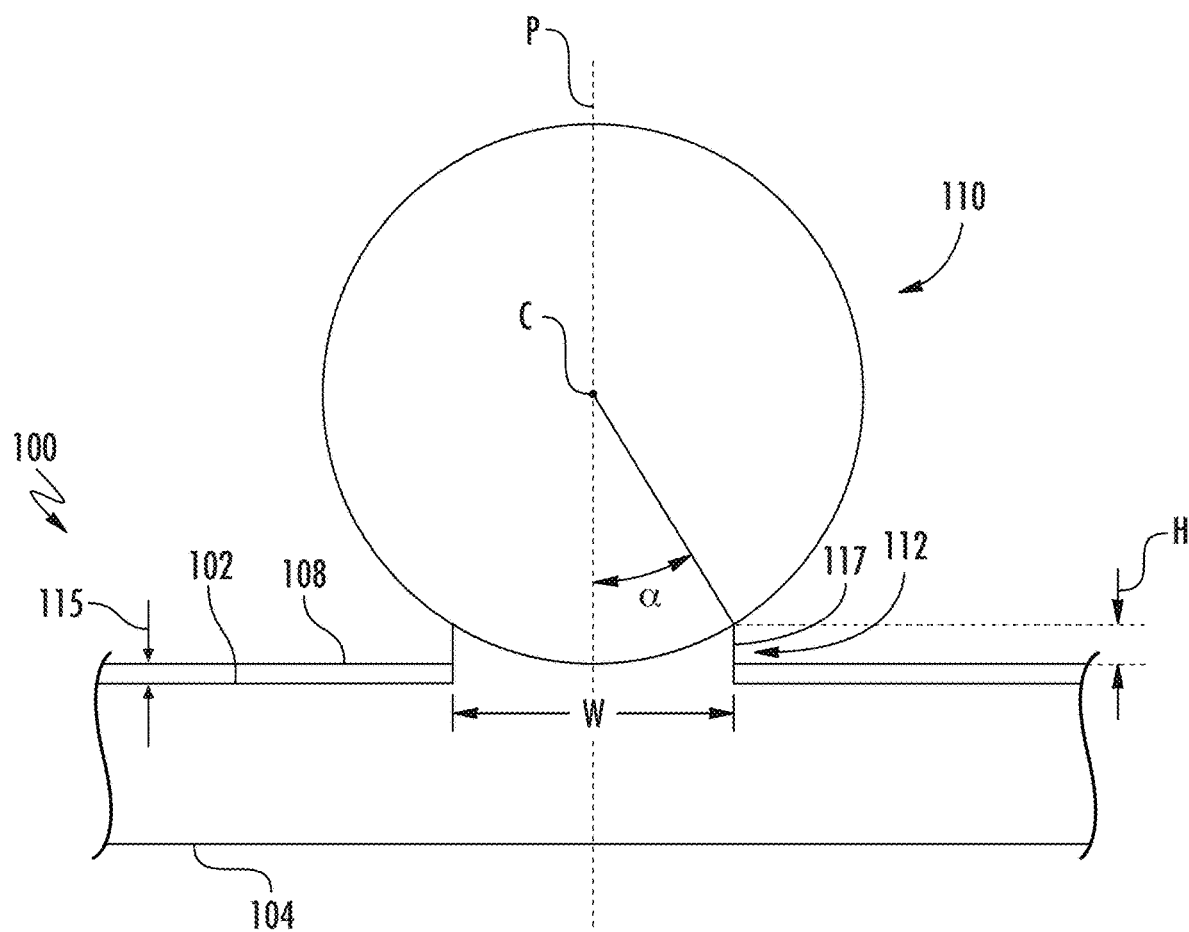
FIG. 5 schematically depicts the optical fiber of FIG. 2 bonded to the substrate using a laser beam according to one or more embodiments described and illustrated herein.

Referring now to FIGS. 3-5, an example process for laser welding optical fibers 110 to a substrate 100 is schematically illustrated. Referring first to FIG. 3, an end view of an optical fiber 110 disposed on a substrate 100 is schematically depicted. A film layer 108 is deposited on the first surface 102 (also called the upper surface). The film layer 108 may be deposited on the first surface 102 by any known or yet-to-be-developed process. As non-limiting examples, the film layer 108 may be deposited by sputtering, chemical vapor deposition, physical vapor deposition, and the like. In other embodiments, the optical fiber 110 may be secured to the substrate 100 using a film layer 108 on a different surface of the substrate 100, such as the second surface 104. The film layer 108 is configured to absorb a wavelength of the laser beam, and raise the temperature of the first surface 102 to locally heat and melt the substrate 100, as described in more detail below and illustrated in FIGS. 4 and 5. The material of the film layer 108 should be chosen such that it is absorptive to the wavelength of the laser beam. As a non-limiting example, the film layer 108 may have an absorbance of greater than or equal to 15% as measured by reflectance and transmission of the sample. The absorbance is calculated as 100% minus the transmission value minus the reflectance value. In some embodiments, the substrate 100 is absorptive to a wavelength of the laser beam and may include doped or undoped silicon, glass, glass ceramic, crystals, or other materials.

The thickness 115 of the film layer 108 should be as small as possible to minimize the stress induced in the laser bond area 112 (FIG. 5) but still enabling laser welding. As stated above, most of the stress is concentrated in the substrate 100 because it has a higher CTE than that of the optical fiber 110. The thickness 115 of the film layer 108 is exaggerated in FIGS. 3 and 5 for illustrative purposes. As described in more detail below, the goal is to design an absorbing film layer 108 (either a single film layer or a multi-layer film layer) with an optimized thickness that maximizes laser absorption yet minimizes residual stress in the resulting weld.

The thickness of the film layer 108 may depend on the type of material of the film layer 108. As non-limiting examples, the thickness 115 of the film layer 108 may be less than or equal to 1.5 µm, less than or equal to 1 µm, less than or equal to 750 nm, less than or equal to 500 nm, less than or equal to 250 nm, less than or equal to 100 nm, less than or equal to 50 nm, less than or equal to 25 nm, less than or equal to 10 nm, and less than or equal to 5 nm. Non-limiting materials for the film layer 108 include metals (e.g., stainless steel, chromium, nickel, titanium, copper, cobalt, aluminum, gold, and silver), glasses (e.g., low melting phosphate glasses (e.g., fluoro phosphates, tin boro-phosphates and the like), chalcogenide glasses containing one or more chalcogens (e.g., arsenic selenide chalcogenide glass and arsenic selenide chalcogenide glass doped with germanium), and alumino-borosilicate glass doped with absorbing elements), $ZnO$, $TiO_2$, $Nb_2O_5$, high index materials for an anti-reflective layer (e.g., CrON, $Nb_2O_5$, indium tin oxide (ITO), and the like, an electromagnetic-absorbing oxide material (e.g., inorganic oxide, CeO), and an electromagnetic-absorbing nitride material (e.g., SiN). As described in more detail below, the material and thickness of the film layer 108 should be such that the material of the substrate 100 at the first surface 102 melts due to the absorption of the laser beam by the film layer 108.

Still referring to FIG. 3, the optical fiber 110 is disposed on the film layer 108 such that a contact area 113 is defined by contact between the optical fiber 110 and the film layer 108. The contact area 113 generally extends along the length of the optical fiber 110 that it is in contact with the film layer 108. It is noted that, in some embodiments, no film layer 108 is provided and the optical fiber(s) 110 is disposed directly on the first surface 102 (and/or second surface 104) of the substrate 100.

In the embodiment illustrated in FIG. 3, the optical fiber 110 has a curved surface and has a generally circular cross-sectional shape. In other embodiments, the optical fiber 110 may have other cross-sectional shapes. The shape of the optical fiber 110 enables the optical fiber 110 to act as a cylindrical lens that focuses an incident laser beam 120 at the contact area 113 without a complicated optical delivery system. Referring now to FIG. 4, the example optical fiber 110 of FIG. 3 is shown having a laser beam 120 passing therethrough. The incident laser beam 120 is weakly focused as it enters the optical fiber 110. The curved upper surface 111 of the optical fiber 110 that receives the laser beam 120 focuses the laser beam 120 to a focused diameter at the contact area 113 that is smaller than a size (e.g., diameter) of the initial diameter of the laser beam 120 as the laser beam 120 enters the optical fiber 110 (i.e., at the upper surface 111 of the optical fiber 110). It is noted that the different line types depicting the ray-tracing of the laser beam 120 correspond to different input angles of the coherent laser beam due to the numerical aperture of the focusing lens (not shown). Thus, FIG. 4 schematically depicts how the optical fiber 110 acts as a cylindrical lens that focuses the laser beam, thereby reducing the size of the laser beam at the contact area 113 without the need for complicated optics. The reduction in size of the laser beam causes the film layer 108 (FIG. 3) to be heated quickly and provide the formation of a bond area 112 (FIG. 5) proximate the contact area 113 (FIG. 3). In some embodiments, an astigmatic beam profile is used to increase the size of the laser bond areas 112 along the fiber axis OA.

The properties of the laser beam 120 may be such that the laser beam melts the material of the substrate 100 at the contact area 113 (FIG. 3) to form a thermal-type bond, thereby causing diffusion between the material of the optical fiber 110 and the material of the substrate 100. The laser beam may be a continuous wave (CW), quasi CW laser beam (i.e., a pulsed laser beam having a high repetition rate, for example, of greater than about 10 kHz), or other type of laser beam. The wavelength of the laser beam 120 is such that the laser beam 120 is absorbed by the film layer 108 to melt the material of the substrate 100. For example, the wavelength of the laser beam 120 may be in the visible, ultraviolet, or near infrared spectral bands. As a non-limiting example, the wavelength of the laser beam 120 may be within a range of about 0.3 µm to about 5 µm, including endpoints. A single laser beam 120 may be used or multiple laser beams may be used to secure the optical fiber 110 (or optical fibers 110) to the substrate 100.

In some embodiments, a single mode laser source is used to generate the laser beam 120 and the laser beam 120 may be in a range of about 0.5 W to about 10 W including endpoints, and be single mode for focusing by the optical fiber 110. The initial diameter of the laser beam 120 at the upper surface 111 of the optical fiber 110 should be equal to or less than the diameter of the optical fiber 110. In some embodiments, for example, the initial diameter of the laser beam is between about 80 µm and about 400 µm, including endpoints. The duration of time that the laser beam 120 is focused by the optical fiber 110 should be long enough to melt the material of the substrate 100 and to form a bond between the optical fiber 110 and the substrate 100. In some embodiments, the focal point of the laser beam is on the surface 102 of the substrate 100.

FIG. 5 schematically depicts an example embodiment of the optical fiber 110 after it is laser welded to the first surface 102 of the substrate 100 by the laser beam 120 (FIG. 4). Particularly, FIG. 5 depicts the topography of a bond area 112 that bonds the optical fiber 110 to the substrate 100. The film layer 108 absorbs a wavelength of the laser beam 120 (FIG. 4), which creates heat that causes the material of the substrate 100 to melt at the contact area 113 (FIG. 3). The melted material of the substrate 100 may diffuse into the optical fiber 110, and may also flow toward the optical fiber 110, thereby forming a laser bond area 112 having a height H as measured from the surface of the film layer 108 (or the first surface 102 of the substrate 100 in embodiments in which a film layer 108 is not used) to an edge 117 of the laser bond area 112 that contacts the optical fiber 110. The height H of the laser bond area 112 is not limited by this disclosure. As an example and not a limitation, the height H of the laser bond area 112 may be about 0.2 µm to about 10 µm including end points.

The width W of the laser bond area 112 is dependent on the diameter of the laser beam 120 (FIG. 4) after the laser beam 120 is focused by the optical fiber 110 (also called the focused diameter of the laser beam). Additionally, an angle α is defined between a plane P through a center C of the optical fiber 110 and an edge 117 of the laser bond area 112 (FIG. 5). The value of the angle α depends on the height H and the diameter of the optical fiber 110. As a non-limiting example, for a range of the height H may be from about 0.2 µm to about 10 µm and a range of optical fiber diameter from about 80 µm to 400 µm, the range of α is from about 2.6 degrees to about 40 degrees.

As shown in FIG. 5, the laser bond area 112 is a region of expanded glass that creates a recess matching the shape of the optical fiber 110 and providing significant contact area with the optical fiber 110. This contact area increases the bonding strength of the optical fiber 110 to the first surface 102 of the substrate 100.

The film layer 108 may be a single layer, or may by formed of multiple layers to tune the desired absorption. FIG. 6A schematically illustrates a first substrate 10 (illustrated as a sheet rather than an optical fiber) and a second substrate 100 having a single film layer 108' disposed therebetween. FIG. 6B schematically illustrates a first substrate 10 and a second substrate 100 having a multi-layer film layer 108" comprising a first film layer 108A, a second film layer 108B, and a third film layer 108C disposed between the first substrate 10 and the second substrate 100.

An ideal laser welding process would have the composition of the laser bond area 112 be identical to the composition of the substrate 100, particularly if the composition of the substrate 100 and the optical fiber 110 are identical. This is ideal because the CTE of the laser bond area 112 is equivalent to the CTE of substrate 100 and the optical fiber 110, and is thus more reliable under environmental temperature variation. However, the presence of the film layer 108 at the laser bond area 112 causes elements of the film layer 108 that are not present within the optical fiber 110 and the substrate 100 to be present within the laser bond area 112 after bonding. For example and as described in detail below, metal from the film layer 108 will then be present within the laser bond area 112.

Figure 8A:
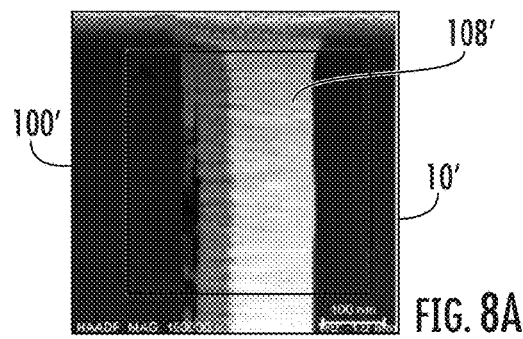
FIG. 8A is a scanning electron microscope image of a 125 nm thick chromium film layer disposed between a first glass substrate and a second glass substrate according to one or more embodiments described and illustrated herein.
Figure 8B:
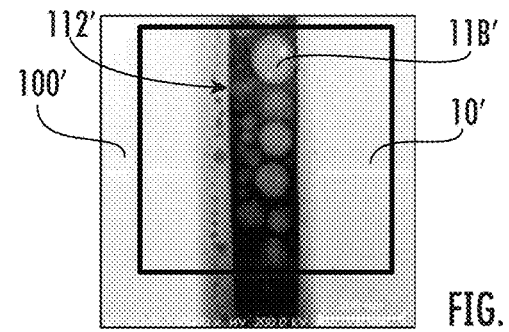
FIG. 8B is a scanning electron microscope image of the first glass substrate welded to the second glass substrate of FIG. 7A following a laser welding process according to one or more embodiments described and illustrated herein.

In the event of laser-welding two substrates with different composition and modulus (e.g., an optical fiber 110 and substrate 100), the CTE of the laser bond area 112 may be such that it is between the CTE of the first substrate (e.g., an optical fiber 110) and the second substrate (e.g., substrate 100) by selection of an appropriate material and thickness for the film layer 108. As a non-limiting example, the film layer 108 may be chosen such that the CTE of the laser bond area 112 is midway between the CTE of the first substrate (e.g., an optical fiber 110) and the second substrate (e.g., substrate 100). If a significant difference exists between the CTE of the laser bond area 112, and the CTE(s) of the first and second substrates, substantial chemical bond strain on the angstrom length scales may prevail under large temperature swings. This relationship is described, to first approximation, as:

$$(CTE)_{weld\ zone} \approx \Sigma_{n=1}^{substrates}(CTE)_n f_n,  \quad \text{Eq. (1)}$$

where the CTE of the laser bond area 112 is taken as a simple sum of the original component materials $(CTE)_n$ (e.g., the optical fiber 110, one or more film layers 108, and the substrate 100) and corresponding mixture fraction, $f_n$, (see FIGS. 8A and 8B).

Thus, a film layer 108 should have a material absorbing (e.g., 20%-80% absorption, including endpoints) at the incident laser wavelength and have a CTE similar to the CTE of both substrates in the case where identical substrates are used, or a CTE intermediate between either the CTE of the first substrate (e.g., optical fiber 110) or the CTE of the second substrate (e.g., substrate 100), in the event different substrates are used.

Another factor modifying the relationship described by Eq. (1) described above is the impact of the number and distribution of differing phases within the laser bond area 112. When the laser transforms a metal film layer 108 from opaque to transparent, and from electrically conductive to non-electrically conductive (i.e., insulation), the initial metal film layer 108 is shattered into nano-particles. From a fracture mechanics perspective, these metallic nano-particles effectively serve as glass flaws that weaken the weld, resulting in fracture toughness well below the theoretical value near 0.7 MPa·√m, for glass (borosilicate) compositions. The bigger the phase inclusion-body defined by the metallic nano-particles with different CTE, the lower the fracture toughness, and the weaker the weld. These features are illustrated by FIGS. 7A-9B. It is these considerations that may be relevant in achieving minimal stress in fiber array welds utilizing absorbing films.

In embodiments, the metal material and the thickness of the film layer(s) 108 are chosen such that a maximum width of the metal nano-particles is kept less than or equal to 750 nm, less than or equal to 500 nm, less than or equal to 250 nm, less than or equal to 100 nm, or less than or equal to 50 nm. The maximum width is the largest dimension across the particle. In spherical particles, the maximum width is the diameter. The particle size should be such that the laser bond area 112 is electrically non-conductive (i.e., having a resistance of 108 Ohm*cm) and is transparent (having greater than or equal to 60% transmittance in the visible wavelength range of 300 nm to 750 nm).

In a non-limiting example, the absorption of the at least one film layer is within a range of 20% and 80% including endpoints at the wavelength of the focused diameter laser beam, the at least one film layer has a reflectance of less than 10% at the wavelength of the focused diameter laser beam, the at least one film layer comprises a metal, and the at least one film layer has a thickness such that metal particles formed by absorption of the focused diameter laser beam have a maximum width of less than or equal to 250 nm.

Figure 7A:
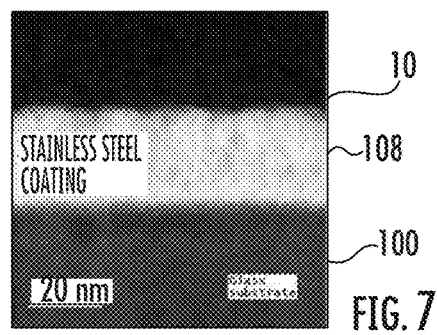
FIG. 7A is a scanning electron microscope image of a 20 nm thick stainless steel film layer disposed between a first glass substrate and a second glass substrate according to one or more embodiments described and illustrated herein.
Figure 7B:
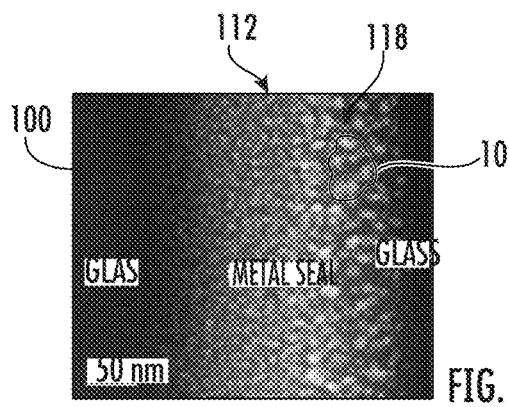
FIG. 7B is a scanning electron microscope image of the first glass substrate welded to the second glass substrate of FIG. 7A following a laser welding process according to one or more embodiments described and illustrated herein.

Several metal films of varying material and thicknesses were evaluated to determine laser bond area attributes, including metal aggregation and particle size. FIG. 7A is a scanning electron microscope (SEM) image of an approximately 20 nm thick stainless steel metal film layer 108 between a first glass substrate 10 (Eagle XG®) and a second glass substrate 100 (also Eagle XG®). A laser beam having 1060 nm CW radiation with power of 5 W, an approximately 250 μm spot, and a translation speed within a range of 5-50 mm/s was incident on the metal film layer 108, which resulted in a laser bond area 112 as shown by the image of FIG. 7B.

FIG. 8A is a SEM image of an approximately 125 nm thick chromium metal film layer 108' disposed between a first glass substrate 10' (a D263T glass substrate sold by SCHOTT North America, Inc.) and a second glass substrate 100' (a BK7 glass substrate sold by SCHOTT North America, Inc.). A laser beam having 1060 nm CW radiation with power of 5 W, an approximately 250 μm spot, and a translation speed within a range of 5-50 mm/s was incident on the metal film layer 108', which resulted in a laser bond area 112' as shown by the image of FIG. 8B.

Figure 9A:
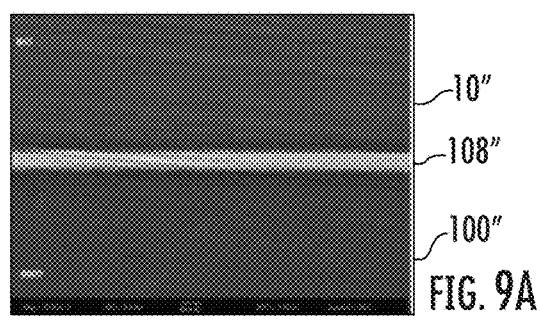
FIG. 9A is a scanning electron microscope image of a 200 nm thick chromium film layer disposed between a first glass substrate and a second glass substrate according to one or more embodiments described and illustrated herein.
Figure 9B:
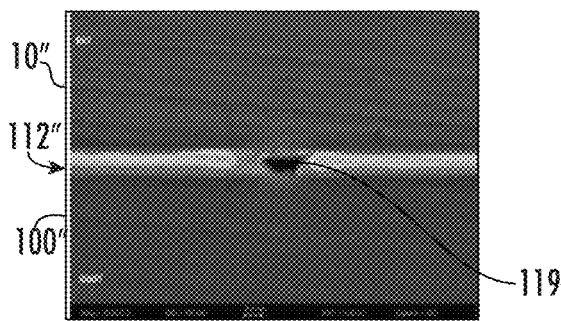
FIG. 9B is a scanning electron microscope image of the first glass substrate welded to the second glass substrate of FIG. 7A following a laser welding process according to one or more embodiments described and illustrated herein.

FIG. 9A is a SEM image of an approximately 125 nm thick chromium metal film layer 108" disposed between a first glass substrate 10" (a D263T glass substrate sold by SCHOTT North America, Inc.) and a second glass substrate 100" (a BK7 glass substrate sold by SCHOTT North America, Inc.). A laser beam having 1060 nm CW radiation with power of 5 W, an approximately 250 μm spot, and a translation speed within a range of 5-50 mm/s was incident on the metal film layer 108", which resulted in a laser bond area 112" as shown by the image of FIG. 9B.

The process of shattering the original absorbing metal film layer into small nano-spherical particles appears more complete and homogeneously distributed in the laser bond area 112 using the 20 nm thick stainless steel films when compared with the thicker chromium film layers of FIGS. 8A and 9A. The maximum width of the metal particles 118 within the laser bond area 112 of FIG. 7A was much less than 50 nm, thereby resulting in a laser bond area 112 having minimal stress. For example, chromium films, approximately 125 nm thick, exhibited larger agglomeration within the laser bond area (metal particles 118' having a maximum width of at least 100 nm), while more catastrophic attributes were manifest as large gaps or voids 119 when 200 nm thick chromium film layer was used for laser welding glass substrates. Although a bond was provided between the first glass substrate 10" and the second glass substrate 110", the presence of voids 119 likely leads to a much weaker bond.

It was found that the laser-weld bond-strength could be maximized by striking a balance between limiting the amount of laser energy delivered, and the type and thickness of metal layer used to shatter the initial metal film into nano-particles. In an example process, the metal film layer thickness is reduced to limit large metallic aggregation in the bond area, and then the absorption of the metal film layer is tuned towards the lower end of the 20-80% range. Such a process reveals attainment of strong laser bonds with characteristically low flaw size and a more homogeneous distribution, resulting in optimally welded glass substrates.

As stated above and illustrated by FIG. 6B, the film layer 108 may comprise multiple film layers to achieve a desired absorption for laser bonding, as well as for other properties, such as anti-reflectance. For example, a first film layer may be configured for anti-reflective behavior while a second film layer may be chosen for absorption at the wavelength of the laser beam.

Figure 10:
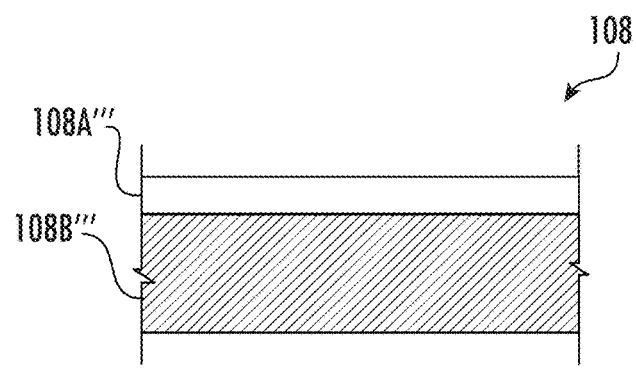
FIG. 10 schematically illustrates a two-layer film layer according to one or more embodiments described and illustrated herein.
Figure 11:
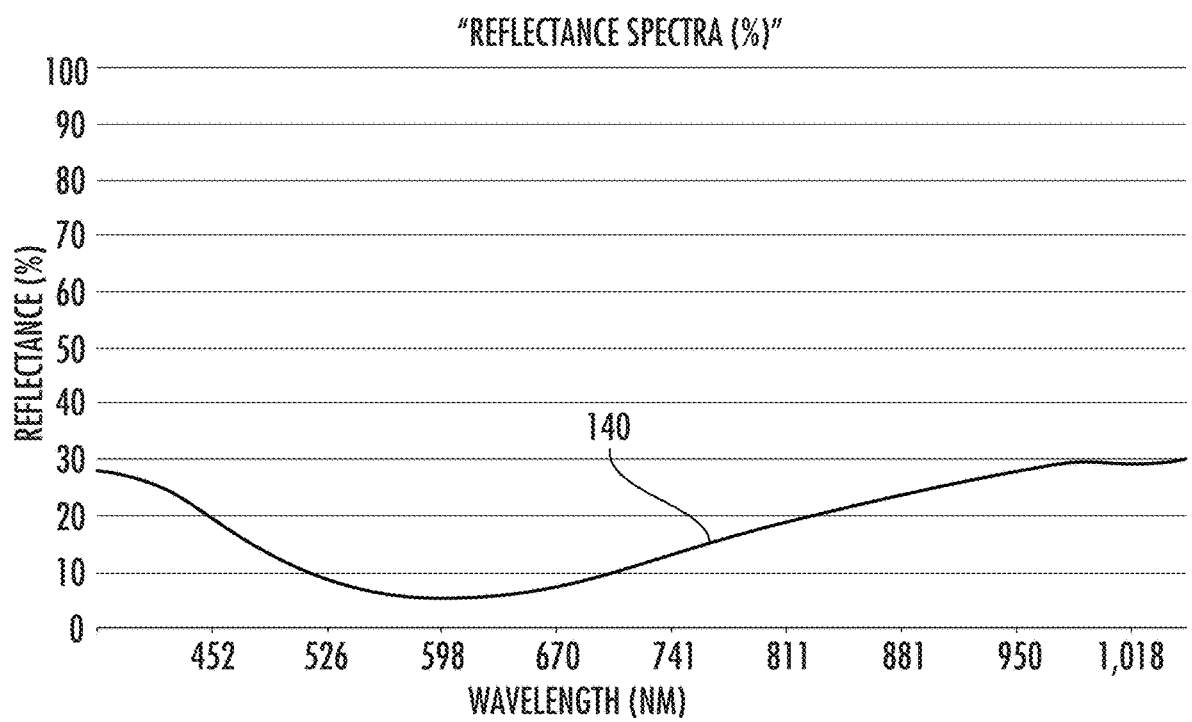
FIG. 11 graphically illustrates reflectance as a function of wavelength for a 50 nm thick chromium oxynitride film layer and a 150 nm chromium film layer according to one or more embodiments described and illustrated herein.

As illustrated by FIG. 10, a two-layer film layer 108''' comprising a first layer 108A''' formed of chromium oxynitride (CrON) and a second layer 108B''' formed of chromium Cr. The first layer may also comprise a high index oxide material transparent in the visible range, such as, without limitation $Nb_2O_5$, AlN, ALON, $Si_3N_4$, and $Si_2N_2O$. Tin-based phosphate glasses may also be used as a first film layer. The film layer 108''' stack was designed as an anti-reflective film near the incident laser wavelength of 532 nm to maximize absorption and limit stray light during the laser welding operation. FIG. 11 is a graph plotting reflectance as a function of wavelength for the two layer film layer 108''' of FIG. 10 wherein the first layer 108A''' is 50 nm thick and the second layer 108B''' is 150 nm thick. As shown by the curve 140, minimum reflectance occurs at approximately 532 nm. The reflectance spectra of FIG. 11 was measured using a F20-EXR thin film spectrometer sold by Filmetrics of San Diego, Calif.

Additionally, the absorption spectra with varying chromium metal layer (second layer 108B''') thicknesses were modeled to explore the potential impact of using thinner metal film layers on the optical behavior. A rigorously coupled wave analysis (RCWA) GSolver program (Saratoga Springs, Utah) was used to perform the modeling. The refractive index of the CrON inorganic film layer 108A''' was selected from the visible range (CrON: n=2.7+0.0i), and its absorption modeled as zero to reflect its transparency in the visible range. The refractive index of the Cr metal film layer 108B''' was similarly selected from the same range (Cr: n=3.1–3.3i). Referring to the graph of FIG. 12, the impact of the chromium metal thickness on the absorption spectra is observed as systematically diminishing absorption while the thickness is varied from 100 nm (curve 141), 75 nm (curve 142), 25 nm (curve 143), and 3 nm (curve 144). The absorption barely diminishes as the metal thickness is varied from 150 nm to 75 nm, but then begins exhibiting the 20-80% absorption range suitable for laser-welding when the thickness is varied between 25 nm and 3 nm. Thus, a 3-25 nm thick chromium film layer in addition to a 50 nm thick CrON layer may be sufficient to support laser welding with optimized bond strength. This process for achieving optimized bond strengths can also be applied with multi-layer film stacks.

As noted above, in some embodiments, no film layer is utilized to absorb the laser beam. Particularly, glass-based substrates that absorb radiation at the incident laser wavelength may be selected to eliminate the use of film layers. In such embodiments, the laser bond areas 112 may consist more of the higher CTE substrate's elements (e.g., substrate 100 shown in FIG. 1), than the optical fibers (e.g., optical fibers 110 shown in FIG. 1), and may offer more economical solutions. For this type of film-less laser process, a mid-IR laser may be utilized to exploit the high absorption property of glass-based substrates in the mid-IR range in which most of the radiation is absorbed in a few microns from the surface of the glass substrate. Glass-based substrates having an absorption in the mid-IR range may have a hydroxyl (—OH) concentration within its composition of 100 ppm or more, 200 ppm or more, 400 ppm or more, 800 ppm or more, 1000 ppm or more, such as 100, 200, 300, 400, 500, 600, 700, 800, 900, 1000, or ppm or more including endpoints and all ranges and subranges therebetween. Hydroxyl (—OH) concentration of substrates herein may be determined by IR spectroscopy.

Non-limiting examples of absorbing glass-based substrates include a soda-lime glass, an aluminosilicate glass, an alkali-aluminosilicate glass, a borosilicate glass, an alkali-borosilicate glass, an aluminoborosilicate glass, an alkali-aluminoborosilicate glass, or a "wet" fused silica glass (e.g., Corning HPFS® 7980, Asahi AQ Series, Asahi AQT Series, or Asahi AQR Series)). Additional non-limiting examples of glass-based substrate include Corning Incorporated glasses (e.g., Eagle XG®, Eagle 2000™, Willow®, and the like), Asahi Glass Co. glasses (e.g., OA10, OA21, and the like), Nippon Electric Glass Co. glasses, and the like.

Figure 13:
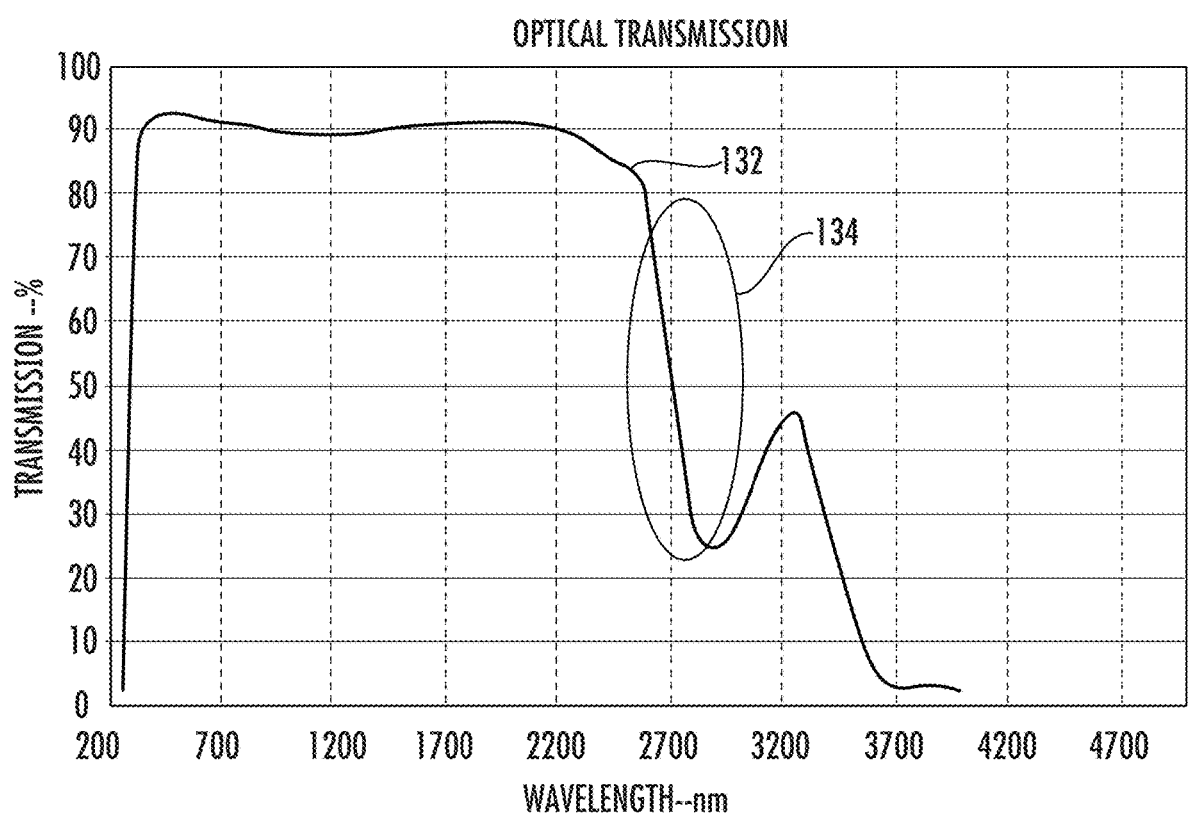
FIG. 13 graphically illustrates transmission of a 2 mm thick Pyrex glass substrate as a function of wavelength according to one or more embodiments described and illustrated herein.
Figure 14:
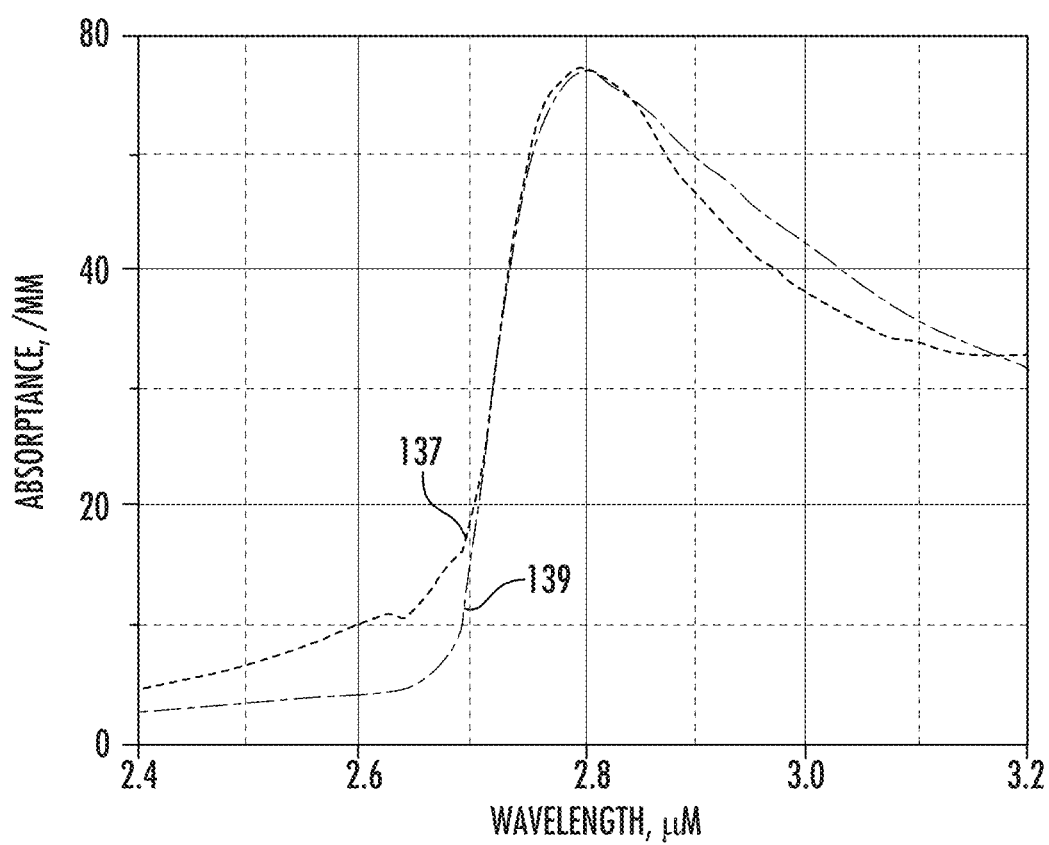
FIG. 14 graphically illustrates absorptance of a 0.7 mm thick Eagle XG® glass substrate as a function of wavelength according to one or more embodiments described and illustrated herein.

FIG. 13 shows the transmission spectrum 132 of Pyrex glass, where the ellipse 134 shows the range of the wavelength tuning band of the laser, where transmission can be adjusted between the approximately 25% and 80% for glass substrates ranging from 2-5 mm thick on the slope of the O—H absorption band. FIG. 14 shows an absorptance spectrum for Eagle XG® glass at room temperature (curve 139) and at 800° C. (curve 137). The maximum absorption for Eagle XG® glass is about 50% per mm.

To create localized heating at the laser bond area 112, without film, a mid-IR laser wavelength may be tuned to the absorption band of the bottom substrate 100, or by multi-photon absorption (e.g. two photon absorption with short pulses), yet transmitting through a transparent top substrate, such as optical fibers 110. A laser in the mid-IR wavelength range with powers up to a 10 s of Watts may be utilized to weld visibly-transparent oxide glass-based substrates. This is due to the fact that most oxide glass-based substrates (with a few exceptions such as fused silica) used in waveguide processes have a very strong absorption peak at 2.6-2.9 μm due to the O—H fundamental band. This band has a very sharp absorption shoulder that allows tuning transmission of the glass-based substrate by proper selection of laser wavelength in a narrow wavelength range (see FIG. 14). Thus, a mid-IR laser may be used to induce swelling of the glass substrate 100 (see FIG. 5), and increase the contact/welded area between the substrate 100 and the optical fiber 110.

The laser produces a laser beam 120 having a wavelength range from 1.9 μm to 3 μm, or from 2.5 μm to 3 μm, or from 2.6 μm to 2.9 μm, or from 2.7 to 2.8 μm, such as 1.9 μm, 2 μm, 2.1 μm, 2.2 μm, 2.3 μm, 2.4 μm, 2.5 μm, 2.6 μm, 2.7 μm. 2.8 μm, 2.9 μm, or 3 μm, including endpoints and all ranges and subranges therebetween. The laser may have a power output from 0.1 W to 20 W, or from 1 W to 10 W, or from 5 W to 15 W, such as 1, 2, 3, 4, 5, 6, 7, 8, 9, 10, 11, 12, 13, 14, 15, 16, 17, 18, 19, or 20 W, or more, including endpoints and all ranges and subranges therebetween.

One example of a tunable mid-IR laser suitable for substrate phonon absorption in the 2.65-2.8 μm wavelength range is the CLT laser from IPG Photonics having a Cr:ZnSe/S crystal as a gain medium. It should be understood that other lasers having the properties described above may be utilized.

In some embodiments, an ultrafast laser (i.e., a laser having a pulse duration of between about 20 fs and 100 ps) is used without an absorbing film layer 108. In other embodiments, the laser has a pulse duration of less than about 50 ps. The laser melts the material of the substrate 100 without a need for the absorbing film layer 108. Due to the material non-linearity and multiphoton absorption process, absorption occurs without an absorbing film. Non-limiting example power values of an ultrafast pulsed laser include a power density more than about 0.5 GW/cm$^2$ with an average power of greater than about 200 mW.

Referring generally to FIG. 4, the laser wavelength may be tuned to the appropriate value where the absorption of the laser beam 120 in the substrate 100 is greater than 20%, or greater than 30% or greater than 40%, or greater than 50% or greater than 60%, or greater than 70% or greater than 80%, so that the absorption depth is a significant portion of the substrate thickness. When using a Pyrex substrate as a non-limiting example, the wavelength should be tuned to be about 2.7 µm. The volume of the melted and swelled material may be significantly larger than in the case of surface absorption using a film layer, and the swelled material from the substrate 100 embraces the bottom of the optical fiber 110. Referring to FIG. 5, the laser bond area 112 may have a larger height H and width W as compared to the approach using a film layer, and may enable a stronger bond and more stable fiber position. In addition, by adjusting the laser power, the irradiation duration, or both, the optical fiber's vertical position versus the substrate may be adjusted.

Embodiments of the present disclosure may also utilize a laser that produces a laser beam in the mid-IR range (2.5 µm to 3 µm, including endpoints) for laser bonding an optical fiber to a substrate. The interaction of the mid-IR laser beam with glass and glass-ceramic substrates is based on the fundamental optical phonon absorption of the O—H bond. The peak of this absorption band is located in the approximately 2.65-2.8 µm wavelength range depending on the glass or glass-ceramic composition.

The laser beam may be tuned to the absorption wavelength of the glass substrate (see FIGS. 13 and 14). One example of a tunable mid-IR laser suitable for substrate phonon absorption in the 2.65-2.8 µm wavelength range is the CLT laser sold by IPG Photonics of Oxford, Mass. having the Cr:ZnSe/S crystal as a gain medium.

Figure 15:
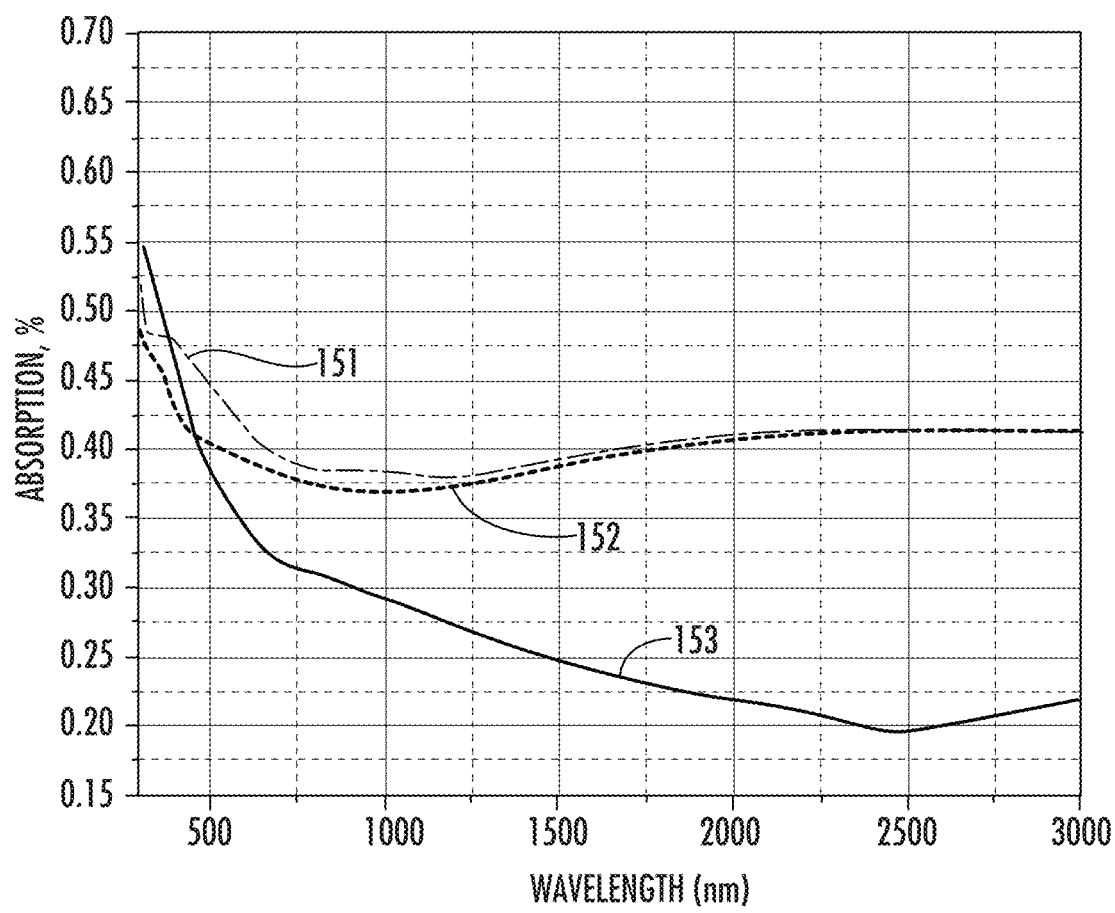
FIG. 15 graphically illustrates absorption as a function of wavelength for a 40 nm thick chromium film layer, a 40 nm thick nickel film layer, and a 40 nm thick titanium layer.

Adding an absorbing film layer (e.g., film layer 108 of FIG. 3) designed for absorption within the 2.6-2.9 µm wavelength range (including endpoints), may add additional features to the optical fiber welding concepts described herein. The film layer at the beginning of the welding process has high absorption, but after a short period of time disintegrates, allowing radiation of the laser beam to penetrate into the substrate (e.g., substrate 100 of FIG. 3). Thermal dissipation at the optical fiber-to-substrate interface into the laser bond area may be engineered by selecting mid-IR absorbing film layers with different thermal conductivity and diffusivity parameters, relative to the mid-IR absorbing glass substrate 100. Therefore, by selecting laser wavelength, power, focusing condition and speed, it is possible to create a unique heating profile resulting in a fine-tuned contact area 113 and swelling effect to bond the optical fiber 110 to the substrate 100. Example parameters includes a CW laser operated at a power in a range of 5-30 W (including endpoints), focused to an approximately 200 µm diameter beam spot, and translated across the optical fiber(s) at a speed with a range of 5 to 100 mm/s (including endpoints). FIG. 15 graphically illustrates the absorption spectra of a 40 nm thick titanium (Ti) film layer (curve 151), a 40 nm thick Cr film layer (curve 152), and a 40 nm thick nickel (Ni) film layer (curve 153).

The combination of absorbing film layer in the mid-IR wavelength range with a mid-IR laser tuned into absorbing band of the glass substrate provides fine tuning of the process (benefit of thinner film, unique stress pattern for discovery of the process), leading to a larger weld contact area and a higher weld strength, precise adjustment/correction of the vertical fiber position vs. the substrate, and the thermal dissipation at the optical fiber-substrate interface into laser bond area is designable by selecting mid-IR absorbing films with different thermal conductivity and diffusivity parameters, and by selecting the material of the mid-IR absorbing glass substrate.

Figure 16:
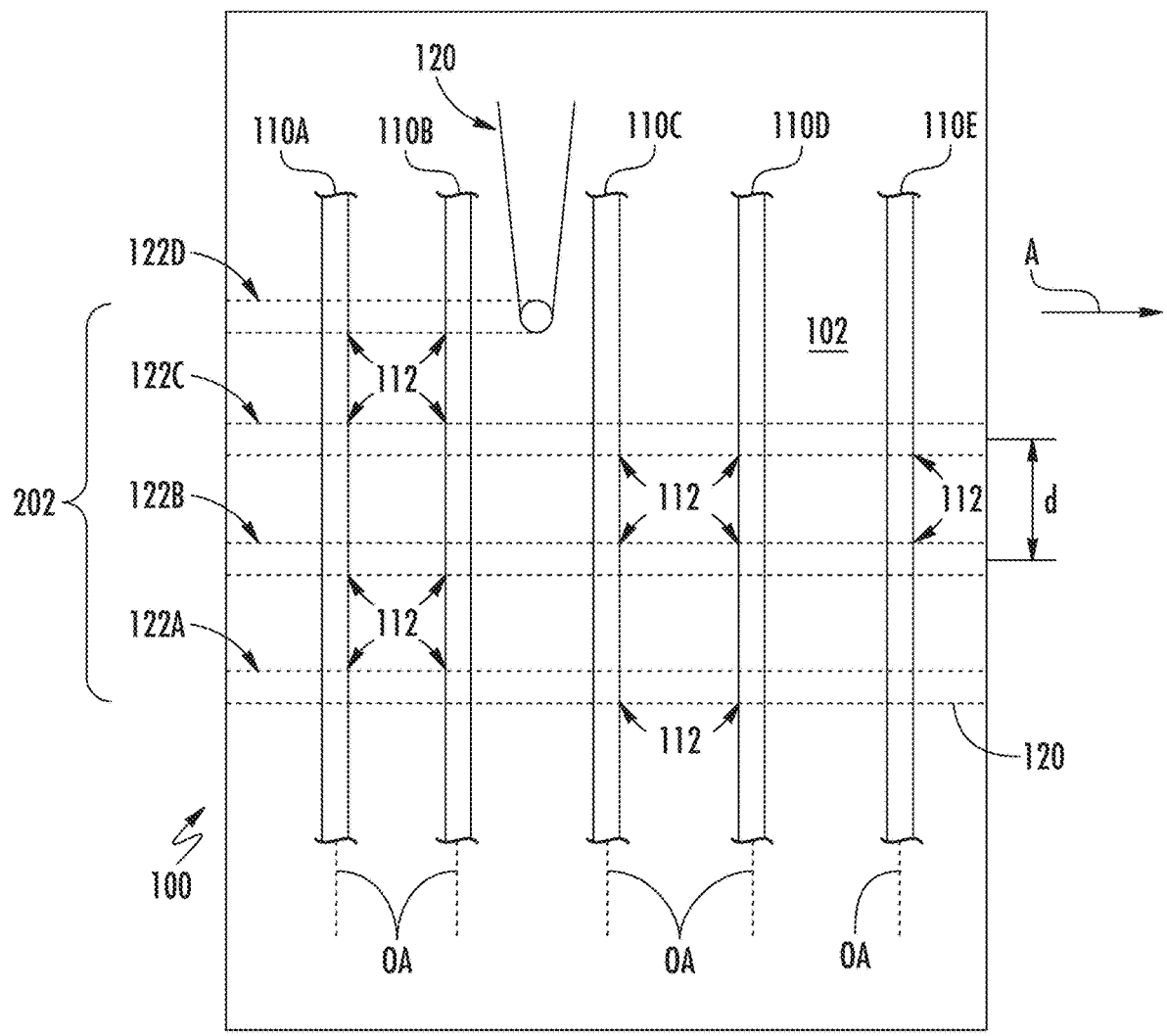
FIG. 16 schematically depicts a top down view of a plurality of optical fibers being bonded to a substrate by a plurality of passes of a laser beam according to one or more embodiments described and illustrated herein.

Multiple optical fibers 110 may be welded to the first surface 102 (and/or the second surface 104) of the substrate 100. FIG. 16 schematically depicts a top-down view of optical fibers 110A-110E disposed on a first surface 102 of a substrate 100. The optical fibers 110A-110E are placed on the first surface 102 of the substrate 100. The laser beam 120 or substrate 100 is then moved (or translated) in a first direction (e.g., direction A) that is transverse (i.e., extending across but not necessarily perpendicular) a longitudinal axis OA of the optical fibers 110A-110E such that the laser beam passes over the optical fibers 110A-110E to form bond areas 112 and the laser bond zone 202. In the example of FIG. 16, the direction A of the laser beam 120 is perpendicular to the longitudinal axis OA of the optical fibers 110A-110E. However, embodiments are not limited thereto. For example, the laser beam 120 (or the substrate 100) may be translated such that the direction A of the laser beam 120 is at a different angle to the OA of the optical fibers 110A-110E. This may result in a diagonal arrangement of the laser bond areas 112 similar to FIG. 1A. In some embodiments, the direction A of the laser beam 120 may even be along or parallel to the longitudinal axis OA of the optical fibers 110A-110E, resulting in an arrangement similar to FIG. 1B. It is noted that the laser beam 120 may be translated relative to the substrate 100, the substrate 100 may be translated relative to the laser beam 120, or both the laser beam 120 and the substrate 100 may be translated.

The laser beam 120 sequentially traverses and bonds (also referred to herein as welding) multiple optical fibers 110A-110E as it travels along direction A in a first pass 122A. As the laser beam 120 enters an optical fiber 110A-110E, it is focused as described above and creates a bond area 112. In some embodiments the material of the substrate 100 outside of the contact areas between the optical fibers 110A-110E and the substrate 100 is not melted by the laser beam 120. Rather, material is only melted at the contact areas (e.g., contact area 113 as shown in FIG. 3) because of the focusing effect of the optical fibers 110A-110E on the laser beam 120. In other embodiments, only those portions of the substrate 100 that are to be bonded to the optical fibers 110A-110E have a film layer 108.

As shown in FIG. 16, multiple passes 122A, 122B, 122C, 122D of the laser beam 120 may be performed to weld the optical fibers 110A, 110B, 110C, 110D, 110E to the substrate 100 at multiple bond areas 112 along the length of the optical fibers 110A, 110B, 110C, 110D, 110E. Together, the bond areas 112 form a bond zone 202. For example, a position of the laser beam 120 or the substrate 100 may be shifted by a distance d in a direction parallel to the longitudinal axis OA of the optical fibers 110A-110E after completion of a pass (e.g., the first pass 122A) to translate in a second direction to perform a subsequent pass (e.g., the second pass 122B) that may also be transverse to the longitudinal axis A of the optical fibers 110A-110E. The distance d may depend on the desired number of bond areas 112 in the laser bond zone 202. After shifting the position of the laser beam 120 or the substrate 100, the laser beam 120 or the substrate 110 is again translated traverse to the longitudinal axis OA of the optical fibers 110A-110E. In FIG. 16, a fourth pass 122D is not yet complete as the laser beam 120 approaches a third optical fiber 110C. As a non-limiting example, the translation speed of the laser beam 120 with respect to the substrate 100 is in the range of about 5 mm/s to about 200 mm/s, including endpoints, and in some embodiments up to about 1 m/s.

Figure 16A:
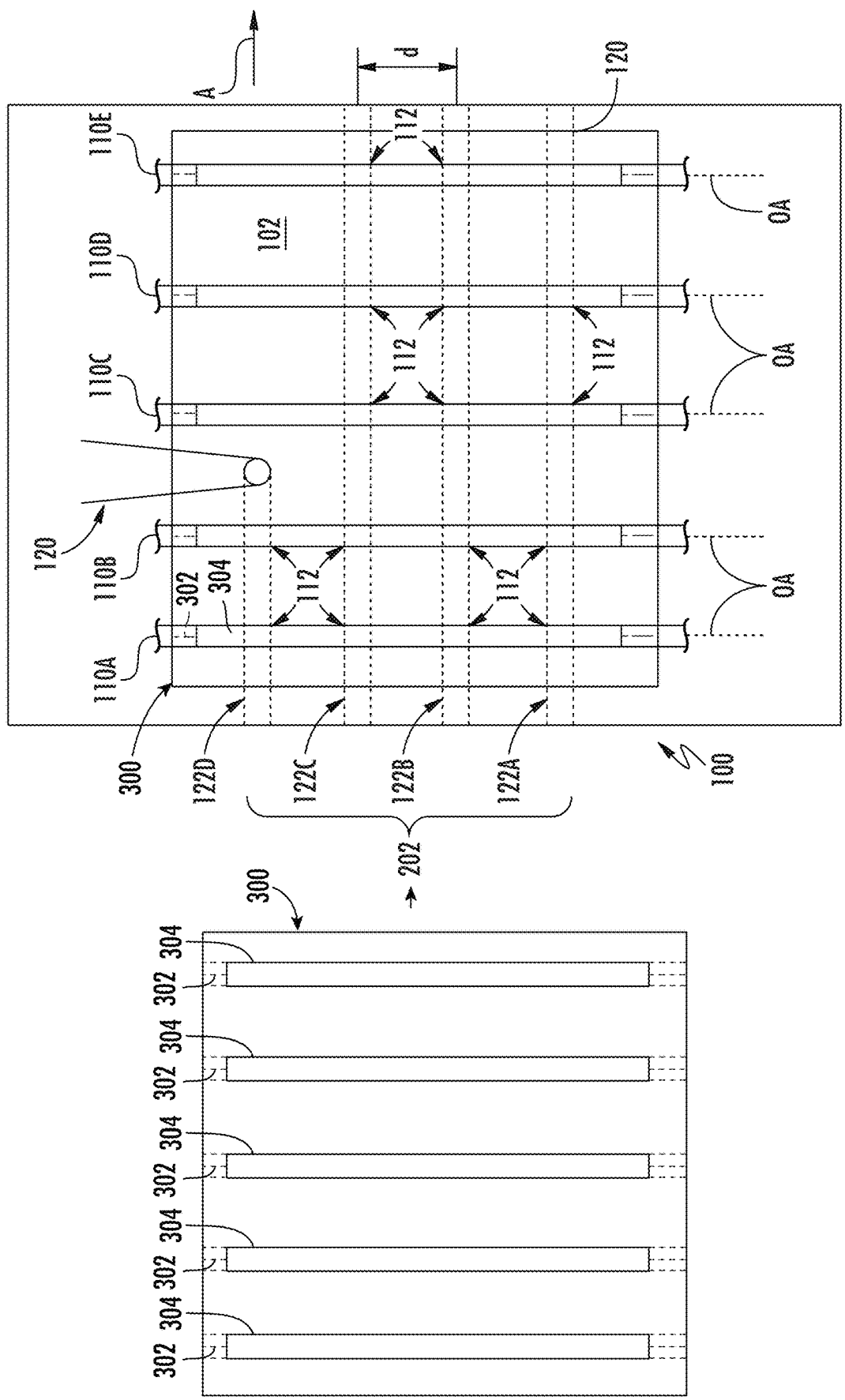
FIG. 16A is similar to FIG. 16, but schematically depicts an embodiment where a mask is used to limit the substrate being exposed to the laser beam except through the plurality of optical fibers.

It was mentioned above that the material of the substrate 100 outside of the contact areas between the optical fibers 110A-110E and the substrate 100 is not melted by the laser beam 120. In addition or alternative to the techniques mentioned above for achieving this, some embodiments may involve the use of a mask over portions of the substrate 100. To this end, and as shown in FIG. 16A, a mask 300 may include v-grooves 302 on one side corresponding to the intended arrangement of the optical fibers 110A-110E on the substrate 100. Each v-groove 302 is configured to be received on one of the optical fibers 110A-110E when positioned over the substrate 100. The mask 300 also includes windows or openings 304 associated with each v-groove 302. For example, a single window 304 between two portions of a given v-groove 304 is provided in the embodiment shown. In alternative embodiments, there may be a series of discrete windows 304 associated with each v-groove 302. The windows 304 allow the optical fibers 110A-110E to remain exposed when the mask 300 is positioned over the substrate 100 and on the optical fibers 110A-110E. The windows 304 may have a width that is slightly larger than, generally the same as, or slightly smaller than the diameter of the optical fibers 110A-110E. The width of the windows 304 may, for example, be within 20%, or even within 10%, of the diameter of the optical fibers 110A-110E.

Advantageously, the mask may be formed from a material that reflects/blocks or otherwise prevents transmission of the laser beam 120 to the substrate 100. As an example, in some embodiments the mask 300 may comprise metals such as Al, Cu, Ag, Au, and/or oxides thereof. As can be appreciated from FIG. 16A, when the mask 300 is positioned over the substrate 100 and on the optical fibers 110A-110E, the windows 304 allow at least some portion of the optical fibers 110A-110E to remain exposed to the laser beam 120. Thus, even though the mask 300 may limit energy from the laser beam 120 from reaching portions of the substrate 100 between the contact areas with the optical fibers 110A-110E (e.g., contact area 113 as shown in FIG. 3), the optical fibers 110A-110E can still focus the laser beam 120 as described above to create bond areas 112. Although FIG. 16A illustrates the mask 300 being smaller than the substrate 100, in alternative embodiments the mask 300 may be larger than the substrate 100.

Figure 17:
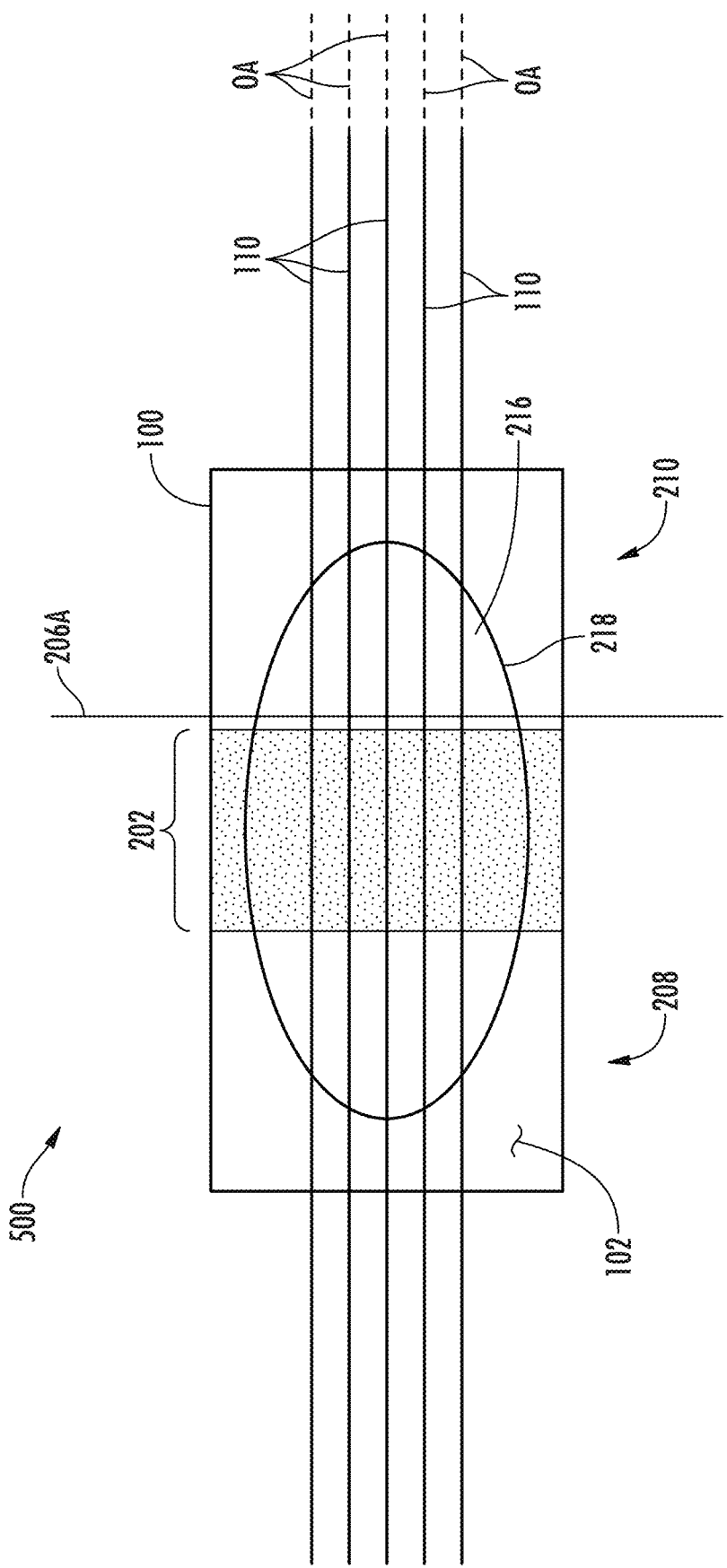
FIG. 17 schematically depicts a top down view of a fiber array having a plurality of optical fibers bonded to a substrate and a cutting line between a first section of the fiber array and a second section of the fiber array according to one or more embodiments described and illustrated herein.

FIG. 17 schematically depicts a top down view of a fiber array 500 having a plurality of optical fibers 110 bonded to a substrate 100 and a cutting line 206A between a first section 208 of the fiber array 500 and a second section 210 of the fiber array 500. As discussed above, securing the optical fibers 110 to the substrate 100 using laser beams can provide a high precision placement and securing of the optical fibers 110 to the substrate 100 without the use of traditional V-groove alignment. However, using a laser beam to secure optical fibers 110 to the substrate 100 may cause the portions of the optical fibers 110 and the substrate 100 that are secured using the laser beam to experience elevated stress compared with the other portions of the optical fibers 110 and the substrate 100. To maintain the high precision placement provided by the laser beam while providing operative coupling surfaces (e.g., cut ends 214 (FIG. 18) of the optical fibers 110) without high stress caused by the laser beam, the fiber array 500 is cut to separate the laser bond zone 202 from the operative optical coupling surfaces (also called cut ends 214 of the optical fibers 110). In practice, one or more optical fibers 110 are placed on the first surface 102 of the substrate 100 as described above. The optical fibers 110 may be placed directly on the first surface 102 of the substrate 100 or on a film layer 108 (FIG. 3) over the substrate 100, as described above. A laser beam 120 (see e.g., FIGS. 4 and 16) is directed into each of the optical fibers 110 disposed on the first surface 102 of the substrate 100, as described above. The laser beam 120 may be translated in a first direction (see e.g., the direction A in FIG. 16) transverse to a longitudinal axis OA of the plurality of optical fibers 110 such that the laser beam passes over the plurality of optical fibers 110 to form a laser bond area (see e.g., laser bond areas 112 in FIG. 1) between each of the plurality of optical fibers 110 and the first surface 102 of the substrate 100. In other embodiments, the substrate 100 is translated such that the laser beam passes over the plurality of optical fibers 110 to form the laser bond areas 112 between each of the plurality of optical fibers 110 and the first surface 102 of the substrate 100. The group of laser bond areas 112 forms the laser bond zone 202.

An adhesive 216 is also applied to the optical fibers 110 and the first surface 102 of the substrate 100 to create an adhesive bond zone 218 between the optical fibers 110 and the first surface 102 of the substrate 100. The adhesive 216 may be any suitable type of bonding agent, such as, but not limited to, a UV curable epoxy, a thermo-curable epoxy, or a two-part epoxy. As illustrated in FIG. 17, the adhesive bond zone 218 may overlap with the laser bond zone 202 and may also extend beyond the laser bond zone 202. In the embodiment illustrated in FIG. 17, the adhesive bond zone 218 covers part but not all of the first surface 102 of the substrate 100. In other embodiments, the adhesive bond zone 218 may cover more or less of the substrate 100 than what is illustrated in FIG. 17. The optical fibers 110 are held in place on the substrate 100 by both the laser bond areas 112 in the laser bond zone 202 and the adhesive 216 in the adhesive bond zone 218.

FIG. 17 illustrates a cutting line 206A, which is a graphical representation of the location at which the optical fibers 110 and the substrate 100 are to be cut. The cutting operation may involve one or more of dicing, laser cutting, and scoring the optical fibers 110 and the substrate 100. In other embodiments, the cutting operation may involve other methods or operations for cutting the optical fibers 110 and the substrate 100.

Figure 18:
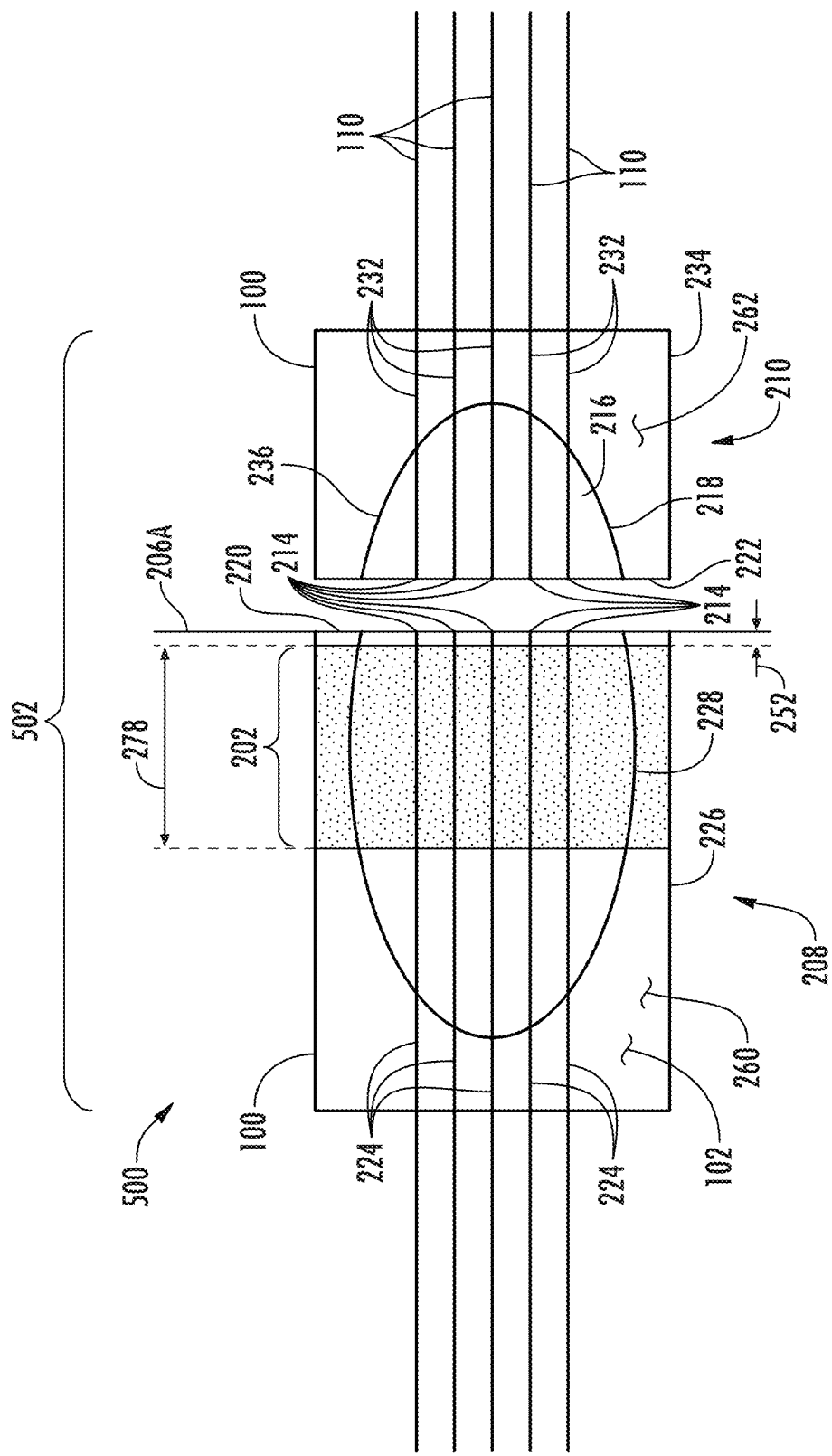
FIG. 18 schematically depicts a top down view of the fiber array of FIG. 7 in which the first section of the fiber array is separated from the second section of the fiber array according to one or more embodiments described and illustrated herein.

FIG. 18 schematically depicts a top down view of the fiber array 500 of FIG. 17 in which the optical fibers 110 and the substrate 100 have been cut along the cutting line 206A to form a first section 208 of the fiber array 500 and a second section 210 of the fiber array 500. Once cut, the first section 208 of the fiber array 500 and the second section 210 of the fiber array 500 each have a cut edge 220, 222. The cut edge 220 of the first section 208, the cut edge 222 of the second section 210, or both cut edges 220, 222 of the first and second sections 208, 210 of the fiber array 500 may be used to form an operative fiber optic coupling surface of an optical device such as an optical connector (see e.g., the fiber optical connector 400 illustrated in FIG. 2). The cut ends 214 of each of the optical fibers 110 of the first section 208 and the second section 210 may be polished or receive other processing steps.

While both the first and second sections 208, 210 of the fiber array 500 may be used to form optical devices, in some embodiments only one of the sections 208, 210 is used to form an optical device and the other section 208, 210 is not used (e.g., discarded). For example, in some embodiments only the second section 210 is used in an optical device, such as an optical connector, and the first section 208 is not used and may be discarded. Whether or not to use a section 208, 210 of the fiber array 500 may depend on the requirements of the end use. For example, some end uses may require that the section 208, 210 of the fiber array 500 does not include any part of the laser bond zone 202. In such uses, only the second section 210 may be used for the optical device but the first section 208 may not be used for the optical device because first section 208 includes the laser bond zone 202. In other uses, a section 208, 210 of the fiber array 500 may be used as long as the laser bond zone 202 is spaced from the cutting line 206A (i.e., spaced from the cut ends 214 of the optical fibers 110). In such applications, both the first and second sections 208, 210 may be used for the application as long as a distance 252 between the cut ends 214 of the optical fibers 110 in the second section 210 are sufficiently spaced from the laser bond zone 202.

As illustrated in FIG. 18, the first section 208 of the fiber array 500 includes a first portion 224 of each of the plurality of optical fibers 110, a first portion 226 of the substrate 100, a first portion 230 of the adhesive bond zone 218, and the laser bond zone 202. The second section 210 of the fiber array 500 includes a second portion 232 of each of the plurality of optical fibers 110, a second portion 234 of the substrate 100, and a second portion 236 of the adhesive bond zone 218. As noted above, the portion of the optical fibers 110 and the substrate 100 in the laser bond zone 202 may experience higher stress than the other portions of the optical fibers 110 and the substrate 100. Stress experienced by the optical fibers 110 and the substrate 100 in the laser bond zone 202 dissipates as a function of the distance from the laser bond zone 202. However as noted above, the laser bond zone 202 provides high accuracy placement of the optical fibers 110. By cutting the fiber array 500 outside of the laser bond zone 202 (i.e., by locating the cutting line 206A outside of the laser bond zone 202) and then using the second section 210 of the fiber array 500 to form a fiber optic device, the fiber optic device does not include the laser bond zone 202 and the distance between the laser bond zone 202 in the cutting line 206A is sufficient such that the stress caused by the laser bond zone 202 does not adversely impact the second portions 232 of the optical fibers 110.

For example, in some embodiments a single mode laser source (not shown) is used to generate a laser beam having an optical power within a range of about 2 W to about 10 W, and an initial diameter of the laser beam is between about 1 μm and about 400 μm. In such embodiments, the cutting line 206A is located at a distance 252 between about 0 μm and about 4 mm from the first laser bond zone 202. In other embodiments, the cutting line 206A is at a distance between about 200 μm and about 4 mm from the first laser bond zone 202. In yet other embodiments, the cutting line 206A is at a distance between about 200 μm and about 1 mm from the first laser bond zone 202. It has been found that these distances from the laser bond zone 202 are sufficient such that the second portion 232 of the optical fibers 110 experiences acceptable amounts of stress from the laser welding process. However, at this distance the optical fibers 110 are still held in high precision alignment by the laser bond zone 202. Thus, the second section 210 of the fiber array 500 has the benefit of the precise alignment caused by the fiber welding without higher stress experienced in the laser bond zone 202.

Figure 19:
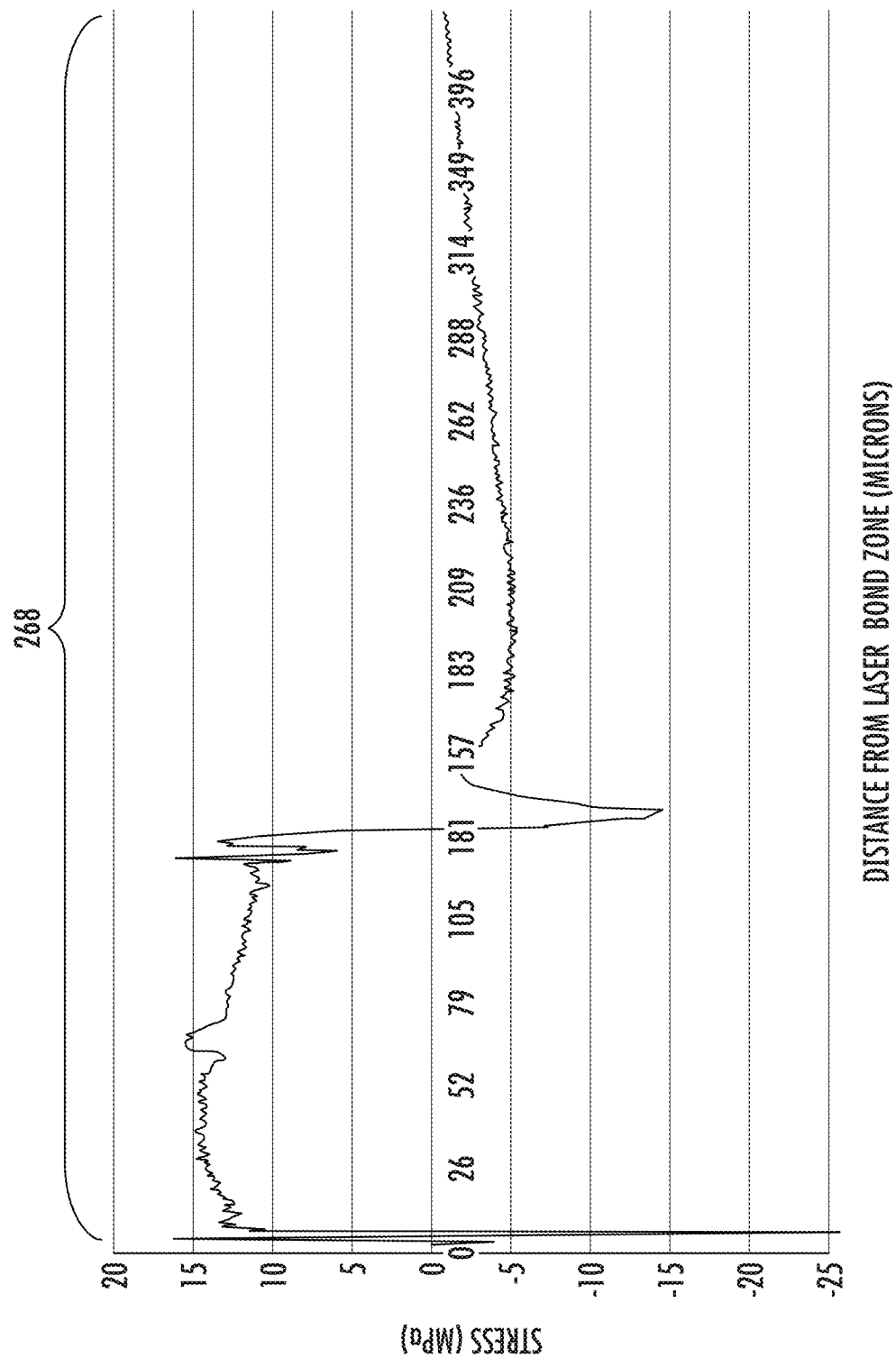
FIG. 19 is a plot illustrating the residual stress fields in an optical fiber and a substrate bonded together using one or more of the embodiments described and illustrated herein.

FIG. 19 illustrates a plot showing tensile and compressive stress of an optical fiber 110 and substrate 100 that have been bonded using a laser beam having an optical power of about 2-5 W, and an initial diameter of the laser beam is less than about 150% of the fiber diameter. In the plot, compression (also called compressive stress) in the optical fiber 110 and substrate 100 is shown in megapascals (MPa) as the positive values on the y-axis, tension (also called tensile stress) in the optical fiber 110 is shown in megapascals (MPa) as the negative values on the y-axis, and distance from the laser bond zone 202 is shown in microns on the x-axis. As shown in the plot, the stress dissipates as a function of the distance along the optical fiber 110 from the laser bond zone 202. In some embodiments, the length of the optical fiber 110 and substrate 100 that experience stress (either tensile stress or compressive stress) outside of specified values is considered to be the stress region 268. In the embodiment illustrated in FIG. 19, for example, the stress region 268 of the optical fiber 110 and the substrate 100 extends a distance of approximately 400 microns from the laser bond zone 202 at which point the tensile stress is less than about −1 MPa. In other embodiments, the stress region may be defined as the length of the optical fiber 110 and the substrate 100 to the point at which the tensile stress or compressive stress is below a different value. For example, in some embodiments the stress region is defined as the length of the optical fiber 110 and the substrate 100 to the point at which the tensile stress is less than about −5 MPa, the tensile stress is less than about −4 MPa, the tensile stress is less than about −3 MPa, or the tensile stress is less than about −2 MPa. In other embodiments, the stress region may be defined as the length of the optical fiber 110 and the substrate 100 to the point at which the compressive stress is below a specified value. In some embodiments, for example, the stress region is defined as the length of the optical fiber 110 and the substrate 100 to the point at which the compressive stress is less than about 1 MPa or at or about neutral (i.e., zero MPa). As used herein, the term "less than" a particular stress amount means stress levels that are closer to neutral stress or zero stress. Thus, for example, tensile stress that is less than about −4 MPa includes stress values between −4 MPa and neutral (zero MPa) including −3 MPa, −2 MPa, −1 MPa. As used herein, neutral stress includes stress that is within +/−0.5 MPa. In some embodiments, the cutting line 206A is at a location outside of a stress region 268 of the optical fibers 110. Thus, in the embodiment illustrated in FIG. 19, the cutting line 206A would be located at a distance equal to or greater than 400 microns from the laser bond zone 202. Depending on the type of laser used, the material of the substrate 100, the material of the optical fibers 110, and other factors, the stress region 268 of the optical fibers 110 may be slightly different. However, by locating the cutting line 206A outside of the stress region 268 the optical fibers 110, the second portions 232 of the optical fibers 110 on the second section 210 of the fiber optic array 500 experience little to no stress from the laser bond zone 202 while still being held high precision alignment by the laser bond zone 202.

In some embodiments, the first laser bond zone 202 comprises a first laser bond zone width (see e.g., the laser bond zone width 278 in FIG. 18), and the cutting line 206A may be located at a distance 252 from the first laser bond zone 202 that is equal to or greater than the first laser bond zone width 278. It has been found that the first laser bond zone width 278 can provide a sufficient distance from the laser bond zone 202 at which the stress from the laser bond zone 202 on the optical fiber 110 is acceptable. Thus, by locating the cutting line 206A at a distance that is equal to or greater than the first laser bond zone with 278, the second section 210 the fiber array 500 includes second portions 232 of the optical fibers 110 that experience little to no stress from the laser bond zone 202 and are still held in precise alignment by the laser bond zone 202.

Once the cutting is completed, the resulting apparatus 502 includes a substrate 100 comprising a first portion 226 having a first surface 260 and a second portion 234 having a second surface 262. The first portion 226 includes a first portion 224 of each optical fiber 110 secured to the first surface 260 at one or more laser bond areas 112 (e.g., laser bond zone 202) and a first portion 228 of the adhesive bond zone 218, wherein the first portion 228 of the adhesive bond zone 218 overlaps the laser bond zone 202. The second portion 234 includes a second portion 232 of the optical fibers 110 secured to the second surface 262 at a second portion 236 of the adhesive bond zone 218, wherein the second portion 232 of the optical fibers 110 comprises a polished end 214.

Figure 20:
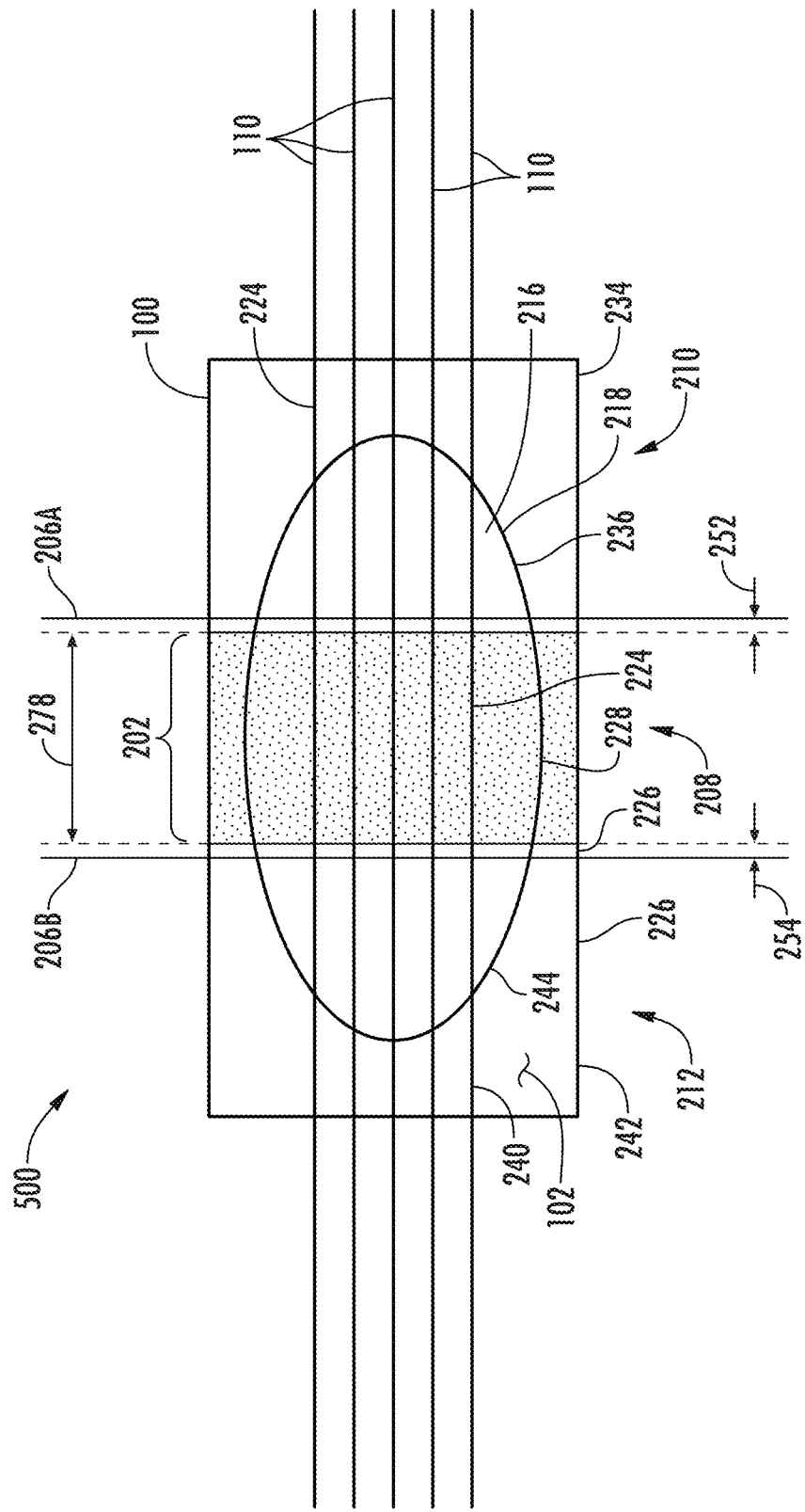
FIG. 20 schematically depicts a top down view of the fiber array of FIG. 7 having a first cutting line and a second cutting line according to one or more embodiments described and illustrated herein.

FIG. 20 schematically depicts a top down view of the fiber array of FIG. 17 having an additional, second cutting line 206B. In practice, the fiber array 500 may be cut at the first cutting line 206A and the second cutting line 206B to create first, second, and third sections 208, 210, 212 of the fiber array 500. The first section 208 includes the first portion 224 of the optical fibers 110, a first portion 226 of the substrate 100, a first portion 228 of the adhesive bond zone 218, and the first laser bond zone 202. The second section 210 includes the second portion 224 of the optical fibers 110, the second portion 234 of the substrate 100, and the second portion 236 of the adhesive bond zone 218. Finally, the third section 212 includes a third portion 240 of the optical fibers, a third portion 242 of the substrate 100, and a third portion 244 of the adhesive bond zone 218. In the embodiment of FIG. 19, third section 212 of the fiber array 500 does not include the first laser bond 202.

The first and second cutting lines 206A, 206B may each be located specified distances 252, 254 from the laser bonding zone 202. For example, in some embodiments a single mode laser source is used to generate the laser beam and the laser beam has an optical power within a range of about 2 W to about 10 W, and an initial diameter of the laser beam is between about 80 μm and about 400 μm. In such embodiments, the first and second cutting lines 206A, 206B are each located at distances 252, 254 between about 0 μm and about 4 mm from the first laser bond zone 202, between about 200 μm and about 4 mm from the first laser bond zone 202, or between about 200 μm and about 1 mm from the first laser bond zone. It has been found that these distances from the laser bond zone 202 are sufficient such that the second and third portions 232, 240 of the optical fibers 110 experiences little to no stress from the laser bonding process. However, the second and third portions 232, 240 of the optical fibers 110 are still held in high precision alignment by the laser bond zone 202.

As noted above, the cutting lines 206A, 206B may also each be located outside of a stress region 268 (FIG. 19) of the optical fibers 110 in some embodiments. Depending on the type of laser used, the material of the substrate 100, the material of the optical fibers 110, and other factors, the stress region 268 of the optical fibers 110 may be slightly different. By locating the cutting line 206A outside of the stress region 268 the optical fibers 110, the second and third portions 232, 240 of the optical fibers 110 experience little to no stress from the laser bonding process.

In other embodiments, the cutting lines 206A, 206B may be located at distances 252, 254 from the laser bond zone 202 that are equal to or greater than the first laser bond zone width 278.

Figure 21:
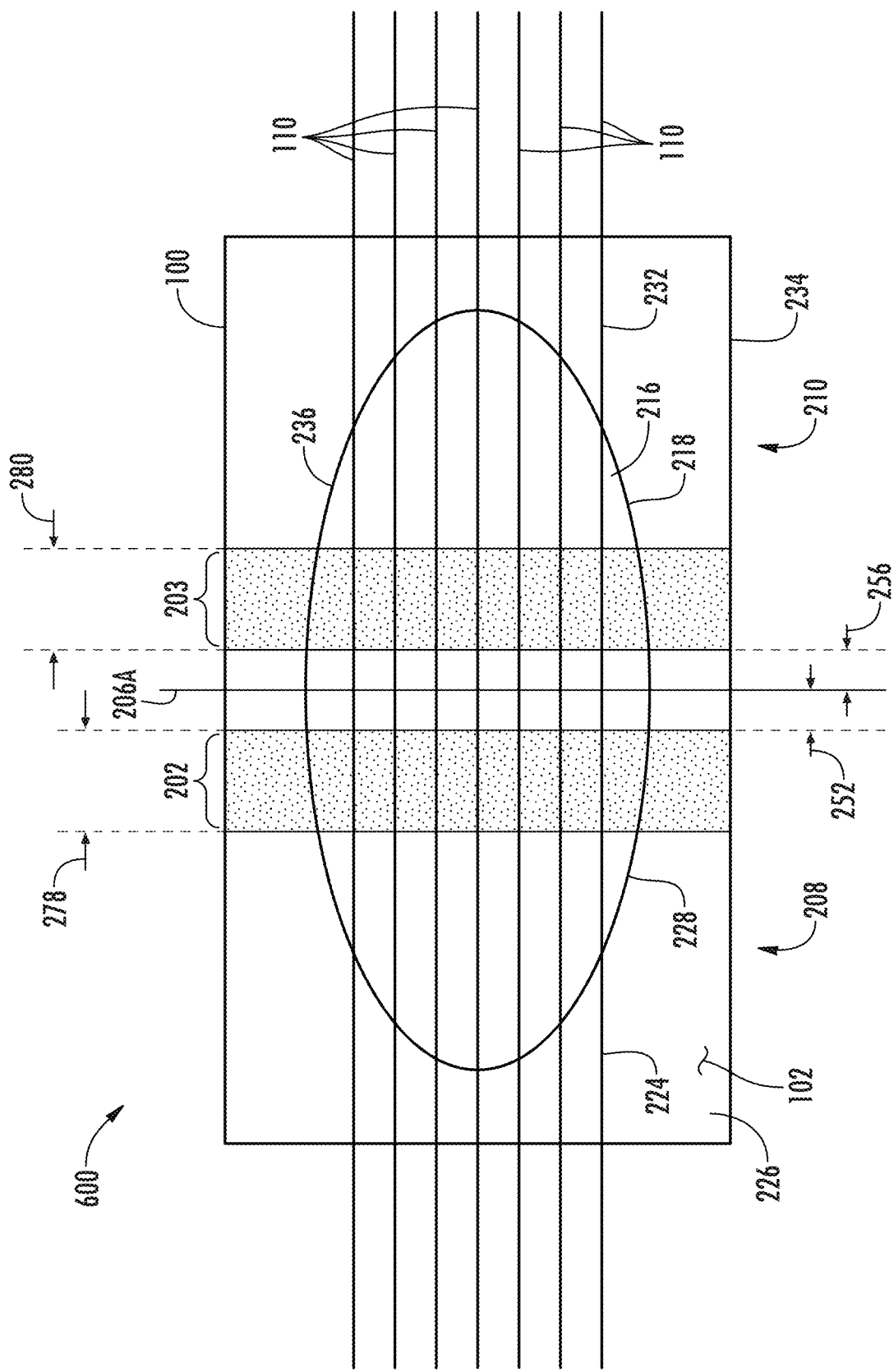
FIG. 21 schematically depicts a top down view of another example of a fiber array having a plurality of optical fibers bonded to a substrate and a cutting line between a first section of the fiber array and a second section of the fiber array according to one or more embodiments described and illustrated herein.

FIG. 21 schematically depicts a top down view of another example of a fiber array 600 having a plurality of optical fibers 110 bonded to a substrate 100 and a cutting line 206A between a first section 208 of the fiber array 600 and a second section 210 of the fiber array 600. However, the fiber array of FIG. 21 includes two laser bond zones: a first laser bond zone 202 and a second laser bond zone 203. The second laser bond zone 203 may be created using the same laser beam or laser beams as were used to create the first laser bond zone 202 or a different laser beam or laser beams (e.g., a second laser beam). To create the second laser bond zone 203, the laser beam (or a second laser beam) is directed into the plurality of optical fibers 110 disposed on the first surface 102 of the substrate 100 at second, different location than the first laser bond zone 202. As described above, the second laser beam melts the material of the substrate 100 to create the second laser bond areas (not illustrated in FIG. 21) between each of the plurality of optical fibers 110 and the first surface 102 of the substrate 100. The group of second laser bond areas forms a second laser bond zone 203.

FIG. 21 illustrates a cutting line 206A between the first and second laser bond zones 202, 203. Once cut, the cut edges of both the first section 208 and the second section 210 may each be processed (e.g., by polishing the cut ends (see e.g., cut ends 214 in FIG. 18) of the optical fibers 110) or receive other processing steps in order for both sections 208, 210 to be used in optical devices such as optical connectors. While both the first and second sections 208, 210 of the fiber array 600 may be used to form optical connectors, in some embodiments only one of the sections 208, 210 is used to form an optical connector (or used for some other purpose in an optical application) and the other section is not used (e.g., discarded).

As illustrated in FIG. 21, the first section 208 of the fiber array includes a first portion 224 of each of the plurality of optical fibers 110, a first portion 226 of the substrate 100, a first portion 228 of the adhesive bond zone 218, and the first laser bond zone 202. The second section 210 of the fiber array 600 includes a second portion 232 of each of the plurality of optical fibers 110, a second portion 234 of the substrate 100, a second portion 236 of the adhesive bond zone 218, and the second laser bond zone 203. By cutting the fiber array 600 outside of both of the laser bond zones 202, 203, the cut ends (see e.g., the cut ends 214 in FIG. 18) of the optical fibers 110 of the first and second sections 208, 210 need not include stress caused by the laser bond zones 202, 203 but may still be held in precise alignment by the laser bond zones 202, 203.

In some embodiments, a single mode laser source is used to generate the laser beam to form the laser bond zones 202, 203 and the laser beam has an optical power within a range of about 2 W to about 10 W, and an initial diameter of the laser beam is between about 80 μm and about 400 μm. In such embodiments, the cutting line 206A is located at distances 252, 256 between about 0 μm and about 4 mm from the first and second laser bond zones 202, 203, between about 200 μm and about 4 mm from the first and second laser bond zones 202, 203, or between about 200 μm and about 1 mm from the first and second laser bond zones 202, 203. In other embodiments, the cut line is at a location outside of a stress region (see, e.g., the stress region 268 illustrated in FIG. 19) of the optical fibers 110. In yet other embodiments, the first laser bond zone 202 comprises a first laser bond zone width 278, the second laser bond zone 203 comprises a second laser bond zone width 280, and the cutting line 206A is located at distances 252, 256 from the laser bond zones 202, 203 that are equal to or greater than the first laser bond zone width 278 and the second laser bond zone width 280, respectively. In other embodiments, the substrate 100 is cut about midway between the first laser bond zone 202 and the second laser bond zone 203.

Figure 22:
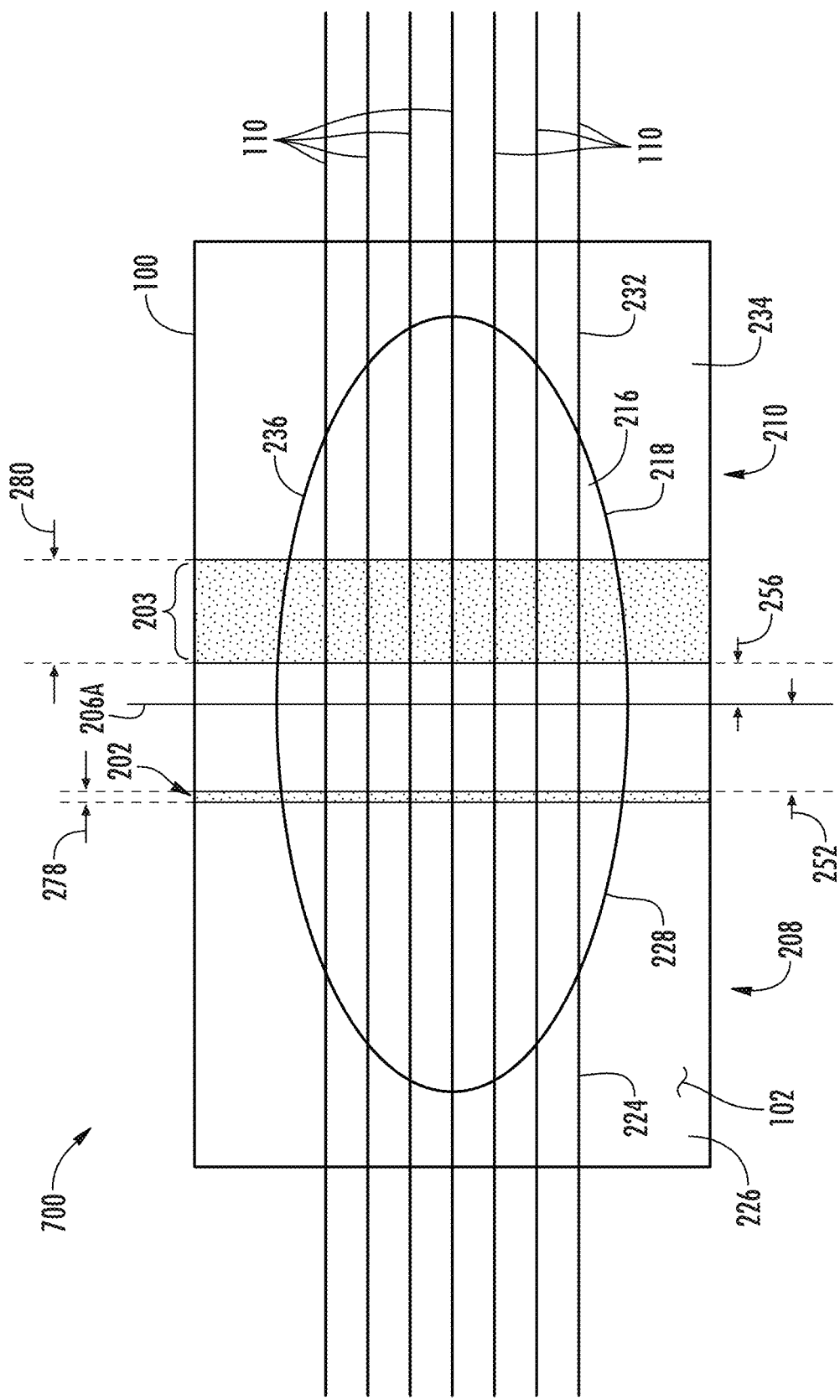
FIG. 22 schematically depicts a top down view of yet another example of a fiber array having a plurality of optical fibers bonded to a substrate and a cutting line between a first section of the fiber array and a second section of the fiber array according to one or more embodiments described and illustrated herein.

FIG. 22 schematically depicts a top down view of yet another example of a fiber array 700 having a plurality of optical fibers 110 bonded to a substrate 100 and a cutting line 206A between a first section 208 of the fiber array 700 and a second section 210 of the fiber array 700. The fiber array 700 of FIG. 22 includes two laser bond zones 202, 203 wherein the first laser bond zone 202 has a smaller bond zone width 278 than the bond zone width 280 of the second laser bond zone 203. The second laser bond zone 203 may be created using the same laser beam as the laser beam used to create the first laser bond zone 202 or a different laser beam (e.g., a second laser beam). To create the second laser bond zone 203, the laser beam (or a second laser beam) is directed into the plurality of optical fibers 110 disposed on the first surface 102 of the substrate 100 at second, different location than the first laser bond zone 202. As described above, the second laser beam melts the material of the substrate 100 to create the second laser bond areas (not illustrated in FIG. 22) between each of the plurality of optical fibers 110 and the first surface 102 of the substrate 100. The group of laser bond areas forms a second laser bond zone 203.

FIG. 22 illustrates a cutting line 206A between the first and second laser bond zones 202, 203. Once cut, the cut edges of both the first section 208 and the second section 210 may each be processed (e.g., by polishing the cut ends (see e.g., cut ends 214 in FIG. 18) of the optical fibers 110) or receive other processing steps in order for both sections 208, 210 to be used in optical devices such as optical connectors. While both the first and second sections 208, 210 of the fiber array 600 may be used to form optical connectors, in some embodiments only one of the sections 208, 210 is used to form an optical connector (or used for some other purpose in an optical application) and the other section is not used (e.g., discarded).

As illustrated in FIG. 22, the first section 208 of the fiber array includes a first portion 224 of each of the plurality of optical fibers 110, a first portion 226 of the substrate 100, a first portion 228 of the adhesive bond zone 218, and the first laser bond zone 202. The second section 210 of the fiber array 600 includes a second portion 232 of each of the plurality of optical fibers 110, a second portion 234 of the substrate 100, a second portion 236 of the adhesive bond zone 218, and the second laser bond zone 203. By cutting the fiber array 600 outside of both of the laser bond zones 202, 203, the cut ends (see e.g., the cut ends 214 in FIG. 18) of the optical fibers 110 of the first and second sections 208, 210 need not include stress caused by the laser bond zones 202, 203 but may still be held in precise alignment by the laser bond zones 202, 203.

In some embodiments, a single mode laser source is used to generate the laser beam to form the laser bond zones 202, 203 and the laser beam has an optical power within a range of about 2 W to about 10 W, and an initial diameter of the laser beam is between about 80 µm and about 400 µm. In such embodiments, the cutting line 206A is located at distances 252, 256 between about 0 µm and about 4 mm from the first and second laser bond zones 202, 203, between about 200 µm and about 4 mm from the first and second laser bond zones 202, 203, or between about 200 µm and about 1 mm from the first and second laser bond zones 202, 203. In other embodiments, the cut line is at a location outside of a stress region (see, e.g., the stress region 268 illustrated in FIG. 19) of the optical fibers 110. In yet other embodiments, the first laser bond zone 202 comprises a first laser bond zone width 278, the second laser bond zone 203 comprises a second laser bond zone width 280, and the cutting line 206A is located at distances 252, 256 from the laser bond zones 202, 203 that are equal to or greater than the first laser bond zone width 278 and the second laser bond zone width 280, respectively. In other embodiments, the substrate 100 is cut about midway between the first laser bond zone 202 and the second laser bond zone 203.

Figure 23:
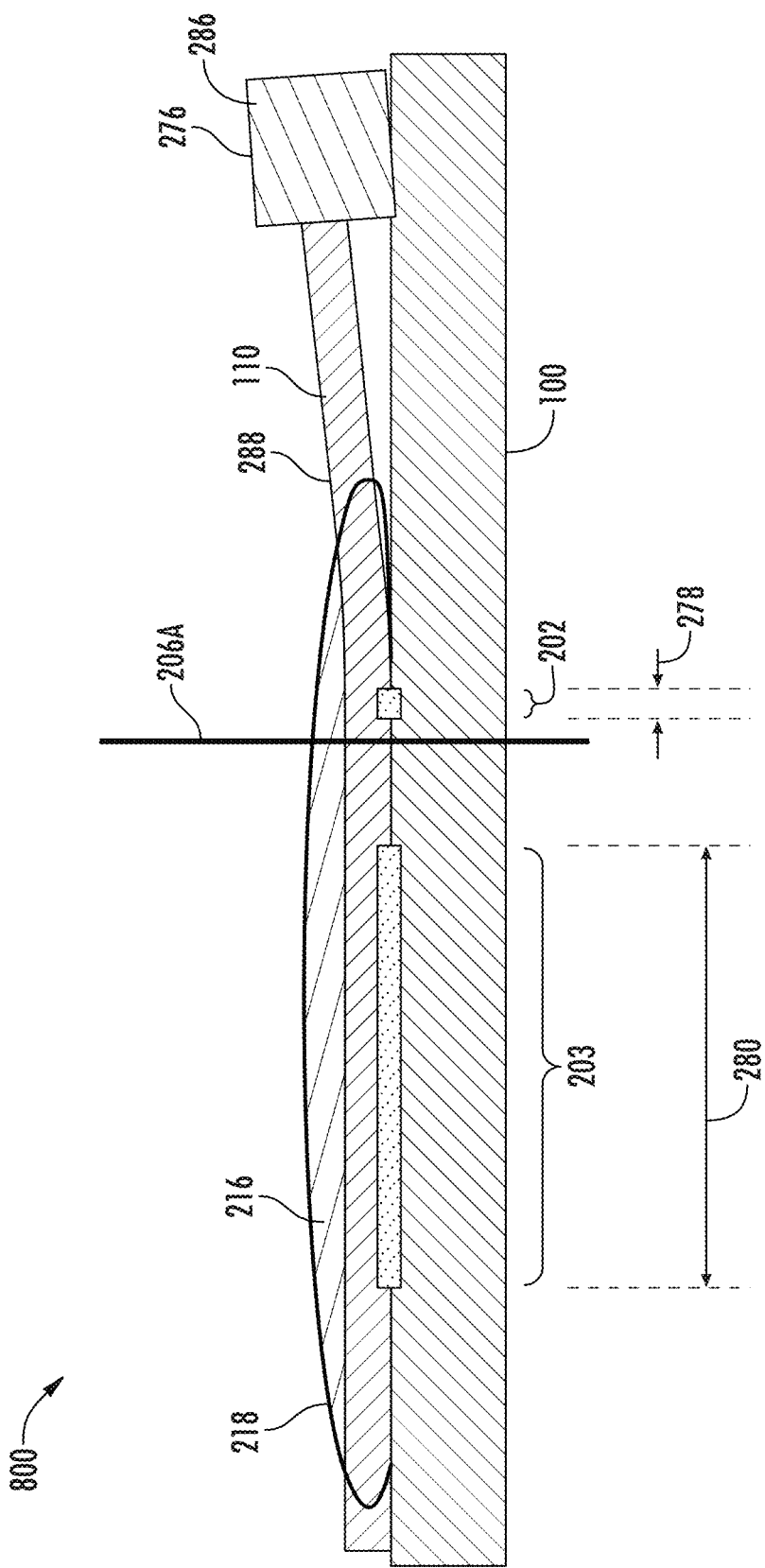
FIG. 23 schematically depicts a side elevation view of another example fiber array having a plurality of optical fibers bonded to a substrate and a cutting line between a first section of the fiber array and a second section of the fiber array according to one or more embodiments described and illustrated herein.

FIG. 23 schematically depicts a side elevation view of an example fiber array 800 having the configuration of the fiber array 700 illustrated in FIG. 21. As noted above, the fiber array 800 includes two laser bond zones 202, 203 wherein the first laser bond zone 101 has a smaller bond zone width 278 than the bond zone width 280 of the second laser bond zone 230. In the embodiment of FIG. 23, the adhesive bond zone 218 extends beyond both of the first and second laser bond zones 202, 203 and overlaps both of the first and second laser bond zones 202, 203. As illustrated in FIG. 23, the optical fibers 110 may include a coated portion 276 having a jacket 276 and an uncoated portion 288, and the uncoated portion 288 is secured to the substrate 100 at the laser bond zones 202, 203 by directing the laser beam into the uncoated portion of the optical fiber 110.

Figure 24:
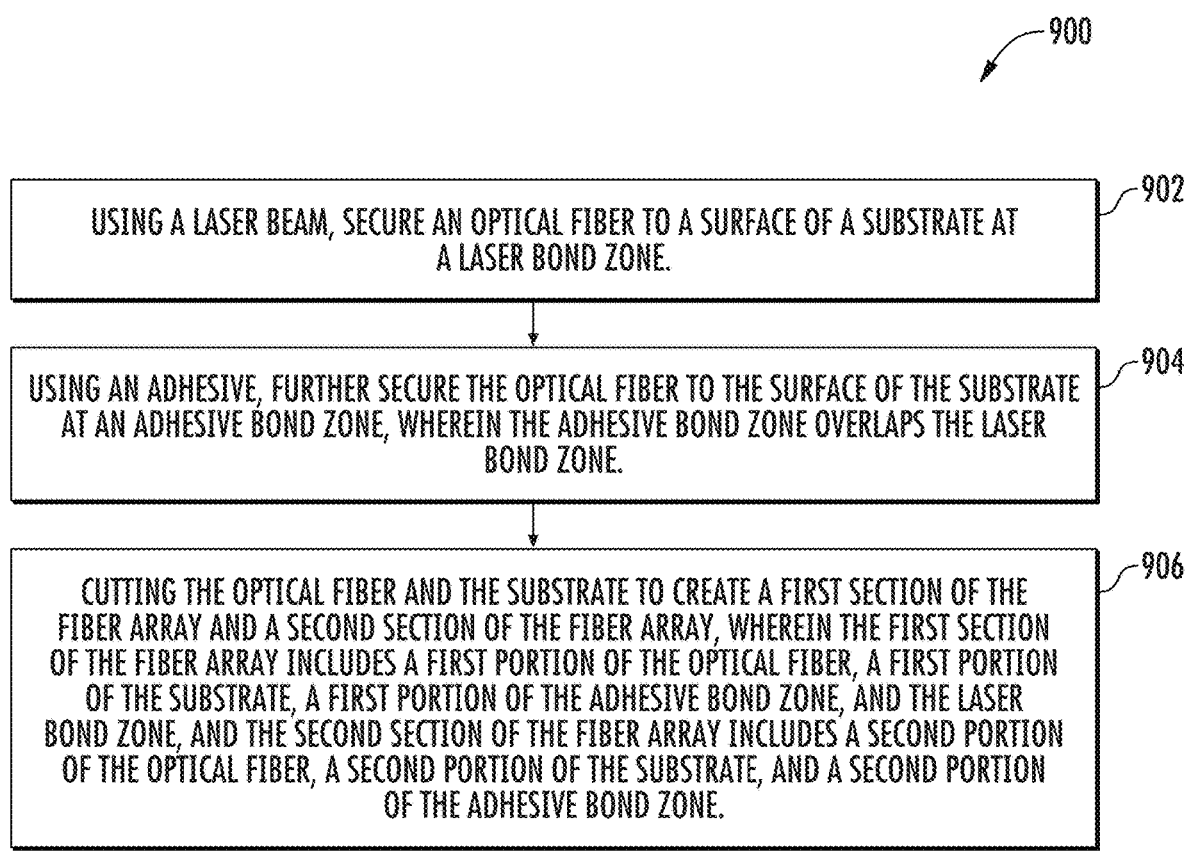
FIG. 24 schematically depicts a method of forming a fiber array according to one or more embodiments described and illustrated herein.

FIG. 24 schematically depicts a method 900 of forming a fiber array according to one or more embodiments described and illustrated herein. The method 900 includes using a laser beam to secure an optical fiber 110 to a surface 102 of a substrate 100 at a laser bond zone 202, as illustrated at block 902, and using an adhesive 216 to further secure the optical fiber 110 to the surface 102 of the substrate 100 at an adhesive bond zone 218, as illustrated at block 904. As noted above, the adhesive bond zone 218 may overlap the laser bond zone 202. The method 900 also includes cutting the optical fiber 110 and the substrate 100 to create a first section 208 of the fiber array 500 and a second section 210 of the fiber array 500, wherein the first section 208 of the fiber array 500 includes a first portion 224 of the optical fiber 110, a first portion 226 of the substrate 100, a first portion 228 of the adhesive bond zone, and the laser bond zone 202, and the second section 210 of the fiber array 500 includes a second portion 232 of the optical fiber 110, a second portion 234 of the substrate 100, and a second portion 236 of the adhesive bond zone, as illustrated at block 906.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:
1. An assembly comprising:
a substrate comprising a surface;
an optical fiber bonded to the surface of the substrate;
a laser bond area between the optical fiber and the surface of the substrate, wherein the laser bond area comprises one or more elements not present in the optical fiber and the substrate outside of the laser bond area; and
at least one film layer disposed on the surface of the substrate, wherein the at least one film layer has an absorption of at least 15% at a wavelength within a range of 300 nm to 5 µm, including endpoints.

2. The assembly of claim 1, wherein:
the at least one film layer comprises a metal; and
the laser bond area comprises metal particles having a maximum width of less than or equal to 500 nm.

3. The assembly of claim 2, wherein the laser bond area is not electrically conductive.

4. The assembly of claim 2, wherein:
the at least one film layer comprises a metal; and
the at least one film layer has a thickness of less than or equal to 300 nm.

5. The assembly of claim 1, wherein the absorption of the at least one film layer is within a range of 20% and 80% including endpoints at a wavelength within the range of 400 nm and 3 μm, including endpoints.

6. The assembly of claim 1, wherein the absorption of the at least one film layer is within a range of 20% and 80% including endpoints at wavelength within a range of 300 nm and 3 μm, including endpoints.

7. The assembly of claim 1, wherein the at least one film layer has a reflectance of less than 10% at a wavelength within the range of 400 nm and 3 μm, including endpoints.

8. The assembly of claim 1, wherein the absorption of the at least one film layer is within a range of 20% and 80% including endpoints at a wavelength within the range of 2.6 μm and 3 μm, including endpoints.

9. The assembly of claim 8, wherein the at least one film layer has a thickness of less than or equal to 10 nm.

10. The assembly of claim 1, wherein the at least one film layer comprises two or more film layers.

11. The assembly of claim 1, wherein the at least one film layer comprises a metal film layer and an inorganic oxide film layer such that the metal film layer is disposed between the surface of the substrate and the inorganic oxide film layer.

12. The assembly of claim 11, wherein a thickness of the metal film layer is within a range of 3 nm and 150 nm, including endpoints.

13. The assembly of claim 1, wherein:
the absorption of the at least one film layer is within a range of 20% and 80% including endpoints at a wavelength within the range of 400 nm and 3 μm;
the at least one film layer has a reflectance of less than 10% at a wavelength within the range of 400 nm and 3 μm;
the at least one film layer comprises a metal; and
the at least one film layer has a thickness such that metal particles within the laser bond area have a maximum width of less than or equal to 250 nm.

14. The assembly of claim 1, wherein the optical fiber has a first coefficient of thermal expansion, the substrate has a second coefficient of thermal expansion, and the laser bond area has a coefficient of thermal expansion that is between the first coefficient of thermal expansion and the second coefficient of thermal expansion.

15. The assembly of claim 1, wherein the substrate comprises glass having a hydroxyl (—OH) concentration greater than or equal to 300 ppm.

16. The assembly of claim 1, wherein the optical fiber comprises fused silica.

17. The assembly of claim 1, further comprising a connector housing, wherein the substrate and the optical fiber are disposed within the connector housing.

18. The assembly of claim 1, wherein:
the optical fiber is one of a plurality of optical fibers bonded to the surface of the substrate in a similar manner, and
for each optical fiber of the plurality of optical fibers, the laser bond area is one of a plurality of laser bond areas that are spaced apart from each other along a length of the optical fiber.

19. An assembly comprising:
a glass-based substrate comprising a planar surface, wherein:
the glass-based substrate has a hydroxyl (—OH) concentration greater than or equal to 300 ppm; and
the glass-based substrate has an absorption of at least 15% at a wavelength within a range of 2.5 μm and 3 μm; and
an optical fiber bonded to the planar surface of the glass-based substrate by a laser bond area.

20. The assembly of claim 19, wherein the optical fiber comprises fused silica, and wherein the substrate comprises a soda lime glass, an aluminosilicate glass, an alkali-aluminosilicate glass, a borosilicate glass, an alkali-borosilicate glass, an aluminoborosilicate glass, or an alkali-aluminoborosilicate glass.

* * * * *